United States Patent
Gulabrani et al.

(10) Patent No.: US 11,947,777 B2
(45) Date of Patent: *Apr. 2, 2024

(54) METRIC PRESENTATION WITHIN A FLOW BUILDER

(71) Applicant: salesforce.com, inc., San Francisco, CA (US)

(72) Inventors: Ritika Gulabrani, San Francisco, CA (US); Alejandro Lopez, Van Nuys, CA (US); Brady Sammons, Walnut Creek, CA (US); Yenjui Liu, Pleasanton, CA (US); Namrata Mehta, Milpitas, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,697

(22) Filed: Aug. 31, 2022

(65) Prior Publication Data

US 2023/0067380 A1 Mar. 2, 2023

Related U.S. Application Data

(63) Continuation of application No. 16/948,461, filed on Sep. 18, 2020, now Pat. No. 11,460,975.

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04847* (2013.01); *G06F 9/451* (2018.02); *G06F 16/248* (2019.01)

(58) Field of Classification Search
CPC .... G06F 3/0482; G06F 3/04847; G06F 9/451; G06F 16/248
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| | (Continued) | |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Claudia Dragoescu
(74) *Attorney, Agent, or Firm* — Weaver Austin Villeneuve & Sampson LLP

(57) ABSTRACT

Disclosed are some implementations associated with a flow builder application including a graphical representation of a flow. Performance data associated with the flow can be obtained. A set of metrics associated with the flow can be generated or updated based, at least in part, on the performance data. The set of metrics can include one or more metrics collected across one or more flow runs. At least a portion of the set of metrics can be provided for presentation within the flow builder application in relation to one or more elements of the flow. The portion of the set of metrics can indicate a performance condition including a duration of the one or more elements of the flow. A request to edit the flow based on the performance condition can be processed, and the graphical representation of the flow can be modified.

20 Claims, 17 Drawing Sheets

(51) Int. Cl.
*G06F 3/04847* (2022.01)
*G06F 9/451* (2018.01)
*G06F 16/248* (2019.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |

(56) References Cited

U.S. PATENT DOCUMENTS

| | | |
|---|---|---|
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0281845 A1* | 11/2009 | Fukuda ............ G06Q 10/06393 705/7.39 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0278754 A1* | 9/2014 | Cronin .................. G06F 16/244 705/7.29 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0341212 A1* | 11/2015 | Hsiao ...................... H04L 67/75 715/735 |
| 2015/0350437 A1* | 12/2015 | Vymenets ............ G06Q 30/016 379/265.03 |
| 2017/0199727 A1* | 7/2017 | Lau ........................ G06F 3/0484 |

* cited by examiner

METRIC PRESENTATION WITHIN A FLOW BUILDER

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This patent document generally relates to systems and techniques associated with generation, configuration, and execution of process flows. More specifically, this patent document discloses techniques for configuring and implementing security measures for execution of process flows.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, electronic mail (email) systems, and instant messaging systems, by way of example, in a cloud computing environment.

An organization may provide a variety of services to users via an organization's website. To ensure that data remains secure, users are often assigned individual permissions that govern the data that they can access. Automated processes typically apply the individual permissions of users to prevent organizational data from being compromised.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

DETAILED DESCRIPTION

Figure 1:
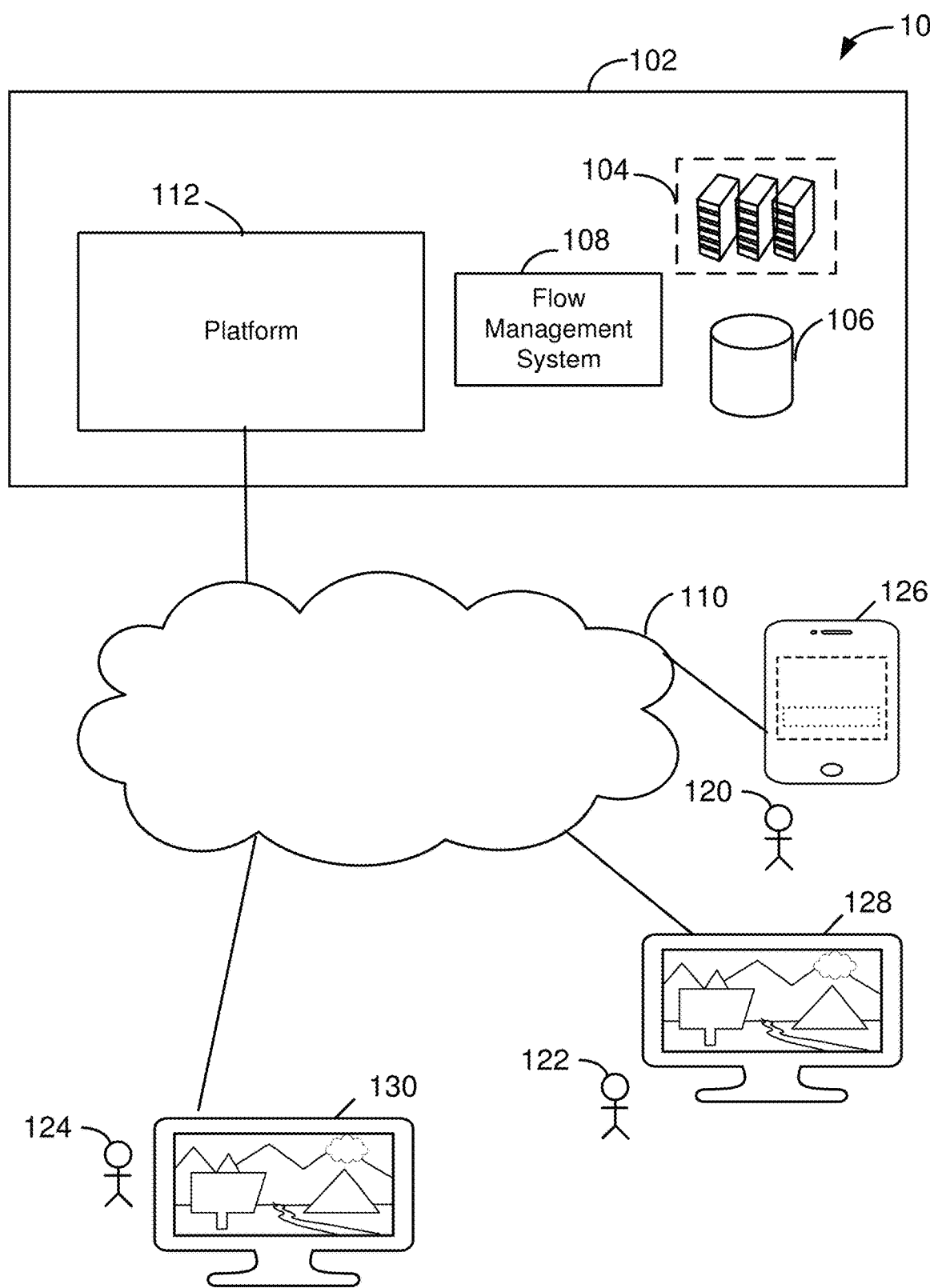
FIG. 1 shows a system diagram of an example of a system 100 in which a flow management system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for managing process flows. Process flow management can include generation, configuration, and/or execution of process flows according to the corresponding configurations. A process flow may also be referred to as a flow. A flow can include one or more elements, which can each correspond to an individual step or a flow. A flow element within a flow may be referred to as a sub-flow.

In some implementations, individual flows may be generated using a flow builder that can be accessed via a corresponding web page. Information including an identification of elements of the flow and indicating an order in which the elements are executed can be stored in a file or data structure such as a linked list, tree, or other suitable data structure. Each flow may be represented by a visual representation that can be rendered via a display of a client device. A flow can include one or more elements that each corresponds to a set of computer-readable instructions.

A user within an organization or external to the organization may initiate execution of a flow. During execution of a given flow, that flow will often access various categories of data. For example, the data accessed by a flow may include, but is not limited to, user data, sales data, marketing data, or account data. In some instances, data accessed by a flow will be processed without displaying or otherwise providing the user access to the data.

In some implementations, an element of a flow includes a "screen element." A screen element may correspond to a set of computer-readable instructions configured to provide a graphical user interface (GUI) for rendering via a display. For example, the GUI can be rendered via a web page. A screen element may enable user input to be submitted via a client device. In addition, a screen element may enable data to be retrieved and provided for display via a client device. Where a sub-flow corresponding to a user interface element is executed, output of the sub-flow may be displayed. Therefore, data accessed or generated by a flow may be displayed or otherwise provided to the user.

Since users can have access to sensitive organizational data by accessing system flows, organizations typically maintain strict security measures. These security measures are typically enforced via a single security configuration, within a user profile, for a user that applies to all flows that can be accessed via the system. Unfortunately, these broad security measures do not enable organizations to implement granular security measures for individual process flows. In addition, configuring flow security within user profiles can be a tedious and cumbersome process for organizations having numerous users. Furthermore, organizations have been unable to implement security measures for users for whom the organization does not have user profiles that include a flow security configuration.

In many instances, organizations use a test system implemented via a "test org" to debug flows before deploying the flows. Deployment can include deploying to one or more servers or server clusters. Such deployment can involve deploying flows to servers that provide a variety of services. The ability to deploy flows can be particularly useful in the deployment of software to customers such as companies that implement the flows. However, user profiles can contain confidential information that cannot be disclosed to external entities. Therefore, providing flow security through user profiles is not a practical or scalable way to deploy granular flow security control.

Moreover, administrators tasked with maximizing performance of flows generally have limited information available to them. As a result, it is difficult for administrators to identify specific ways that they can improve the performance of flows. Administrators can expend significant time and effort attempting to identify inefficiencies perceived by users accessing individual flows, as well as reasons for those inefficiencies.

The disclosed implementations facilitate the secure deployment and execution of flows by enabling granular flow security that limits access to flows on a per-flow basis. Flow security may be implemented based, at least in part, on a set of flow permissions that is configured for a corresponding set of flows, which can one or more flows. In this manner, flow permissions can be configured on a per-flow basis. The set of flow permissions can be deployed separately or in combination with associated flow(s) via the generation and transmission of package(s) including the set of flow permissions to server(s) and/or server cluster(s).

In some implementations, a set of flow permissions can be configured via a GUI. During configuration of flow permissions for a set of flows, an indication of a user selection of user-selectable permission option(s) is obtained. Metadata including an indication of the selected permission option(s) can then be stored in association with the set of flows.

For example, an administrator or software developer may configure a set of flow permissions for a flow such that access is limited to a particular individual, group, role, profile type, organizational department in which the flow will be implemented, or tenant of a multi-tenant database system for which the flow will be implemented. The configured permissions can then be applied to prevent unauthorized individuals from executing the flow and accessing confidential information such as database records or associated metadata.

In some implementations, the set of flow permissions associated with a flow are applied to determine whether a user is permitted to access the flow. More particularly, a user profile of a user initiating a flow or for which the flow is initiated may be accessed in response to a request to execute the flow. The system can apply the set of flow permissions to the user profile to ascertain whether the user is authorized to execute or otherwise access the flow.

In some implementations, a set of flow permissions can indicate those users that are authorized to access an associated set of flows. Specifically, the set of flow permissions can include permissions metadata such as identifier(s) and/or characteristic(s) of users, groups of users, or entities permitted to access the set of flows. For example, the set of permissions can r indicate one or more user identifiers, job titles, roles, departments, groups, organizations, tenants, and/or profile types that are permitted to access the set of flows.

In some implementations, a user profile of a user maintains information that can be used to determine whether the user is authorized to access a flow. This information can include, but is not limited to, user identifier such as a name and/or electronic mail (email) address, job title, role, department, group, profile type, organization, and/or tenant.

In some implementations, the system can apply the set of flow permissions to determine that the user is permitted to execute the flow. Upon determining that the user is permitted to execute the flow, the system can initiate execution of the flow. During execution of the flow, flow performance data associated with the flow can be collected. For example, the flow performance data can indicate flow performance data for a single execution of the flow.

In some implementations, flow metrics are generated for an individual flow based, at least in part, on the flow performance data obtained for a plurality of instances of the flow such that the set of metrics reflects the quality of performance of the flow across a plurality of users of the database system. More particularly, the flow performance data associated with each execution of the flow can be used to generate or update metrics associated with the flow such that the metrics reflect performance of the flow associated with all executions of the flow.

In some implementations, an indication of the set of metrics associated with the flow or a portion thereof is provided for presentation by a display within the context of a flow builder that facilitates flow generation. More particularly, the set of metrics can be provided for presentation via a web page within the context of a representation of the flow, enabling system designers to efficiently identify ways to optimize flow performance. Any modifications to the flow deemed to improve flow performance can be made in real-time, via interaction with the representation of the flow, within the context of the flow builder. A modified flow reflecting the modifications can be stored upon user approval of the modifications.

In some implementations, the system generates, collects, or otherwise obtains flow performance data associated with the flow, at least in part, by ascertaining path(s) of the flow that have been traversed, where each of the paths corresponds to one or more of the elements of the flow. In addition, the system may ascertain the number of times a given path is executed during execution of the flow. The set of metrics can indicate, for each of the paths of the flow, a frequency with which the corresponding path is traversed across a plurality of users of the database system.

In some implementations, the system collects the flow performance data associated with screen elements of a flow. For example, the system may ascertain an amount of time the user viewed a GUI associated one of the elements of the flow. As another example, the system may ascertain a quantity of times that the user navigated to the GUI during execution of the flow. The set of metrics can indicate an average amount of time that the GUI associated with the element of the flow was viewed across the plurality of users of the database system and/or an average number of times that the users of the database system navigated to the GUI during execution of the flow.

By way of illustration, Claire is a manager of engineering at an organization Acme Construction, Inc. and has been overseeing the development of a number of process flows including an onboarding process flow for the organization's United States and European offices. The process flows are each tested within a test org. Upon completion of successful debugging of the flows, flow permissions are configured for each of the flows using a flow permissions GUI. The flow permissions and associated flows are packaged and deployed to servers associated with the United States and European offices.

Yucheng is a manager of the sales Department at one of the US offices of Acme Construction, Inc. As manager, Yucheng has a new sales employee, Ritika, complete an "onboarding" process that guides new employees through a series of steps that enables employee records to be generated and appropriate resources to be allocated. Since Ritika is in the sales department, her user profile identifies her as an employee of the sales department with a role of senior sales employee. Ritika logs into the system and accesses the onboarding process so that she can receive a laptop and additional resources. The set of flow permissions associated with the onboarding process identifies three departments that are authorized to access the onboarding process: engineering, sales, and accounting. The system determines that Ritika's profile identifies her as an employee of the sales department and initiates execution in response to Ritika's request to initiate the onboarding process.

During the onboarding process, Ritika selects a laptop instead of a desktop and a laptop is assigned to her. In addition, Ritika has the option to receive paychecks or submit her banking information for direct deposit of her paychecks. Ritika submits her banking information so that her checks will be deposited directly into her bank account. There is a bug in a direct deposit screen, so Ritika spends approximately 8 minutes filling out the banking information. Ritika completes the entire process in 14 minutes.

The system tracks the paths Ritika takes during the onboarding process and records that she has chosen a path including the laptop and direct deposit. The system also records that Ritika has spent 8 minutes on the banking information screen. The system records this data across all of the employees and generates metrics summarizing the information for the onboarding process.

When an employee in the Information Technology (IT) department accesses the flow information for the onboarding process within the context of the flow builder, they ascertain that those employees who chose a path including direct deposit consistently spent more than 7 minutes on the screen. Based upon these metrics, the IT department investigates and identifies a bug which they quickly correct. In addition, the IT department concludes that the number of fields and associated questions presented within the screen is excessive, and modifications to the screen are made to reduce the number of fields and questions presented within the screen. These modifications can be made in real-time without leaving the flow builder, which improves the efficiency with which flows can be successfully debugged and modified.

FIG. 1 shows a system diagram of an example of a system 100 in which a flow management system is implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. In some implementations, storage mediums 106 can store a flow library, computer-readable instructions corresponding to flows in the flow library, and flow configurations indicating the security configurations for various flows. System 102 also includes a flow management system 108 that enables flows to be generated, configured, and executed. Storage mediums 106 can also store user profiles and database records such as customer relationship management (CRM) records, as described in further detail below.

In some implementations, system 102 is configured to store user profiles/user accounts associated with users of system 102. Information maintained in a user profile of a user can include a user identifier such as the user's name, a user email address, and credentials of the user. For example, credentials of the user can include a username and password. The information can include job related information such as a job title, role, group, department, organization, and/or profile type, as well as associated permissions. For example, user profile permissions of a sales employee may enable the sales employee to access sales support services without having access to employee records, as well as read-write access to CRM database records. As another example, user profile permissions of an administrator may enable the administrator to update user profile permissions for new employees and configure flow operation modes.

Client devices 126, 128, 130 may be in communication with system 102 via network 110. More particularly, client devices 126, 128, 130 may communicate with servers 104 via network 110 through platform 112. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, customer user 120 of client computing device 126 may have an account at salesforce.com®. By logging into this account, the user can access services offered to customers. In other instances, customer user 120 does not have an account at salesforce.com®. Employee user 122 may log into their account via client computing device 128 and access the various services provided by servers 104 to employees. For example, employee 122 may be a sales employee that accesses customer account records throughout their day as they interact with customers. Administrator user 124 may similarly log into their account via client computing device 130 to generate flows or configure operation modes for flows. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services via platform 112 or an application installed on client devices 126, 128, 130. More particularly, client devices 126, 128 can log into system 102 via an application programming interface (API) or via a graphical user interface (GUI) using credentials of corresponding users 120, 122, 124 respectively.

In some implementations, flow management system 108 enables a flow comprised of a plurality of elements to be executed according to flow-specific permissions. In addition, an individual flow element can correspond to a sub-flow having flow-specific permissions. Specifically, an element may represent a flow that has been independently configured with corresponding permissions. Therefore, a single flow may execute according to two or more sets of permissions as the various sub-flows are executed. An example flow management system will be described in further detail below with reference to FIG. 2.

Figure 2:
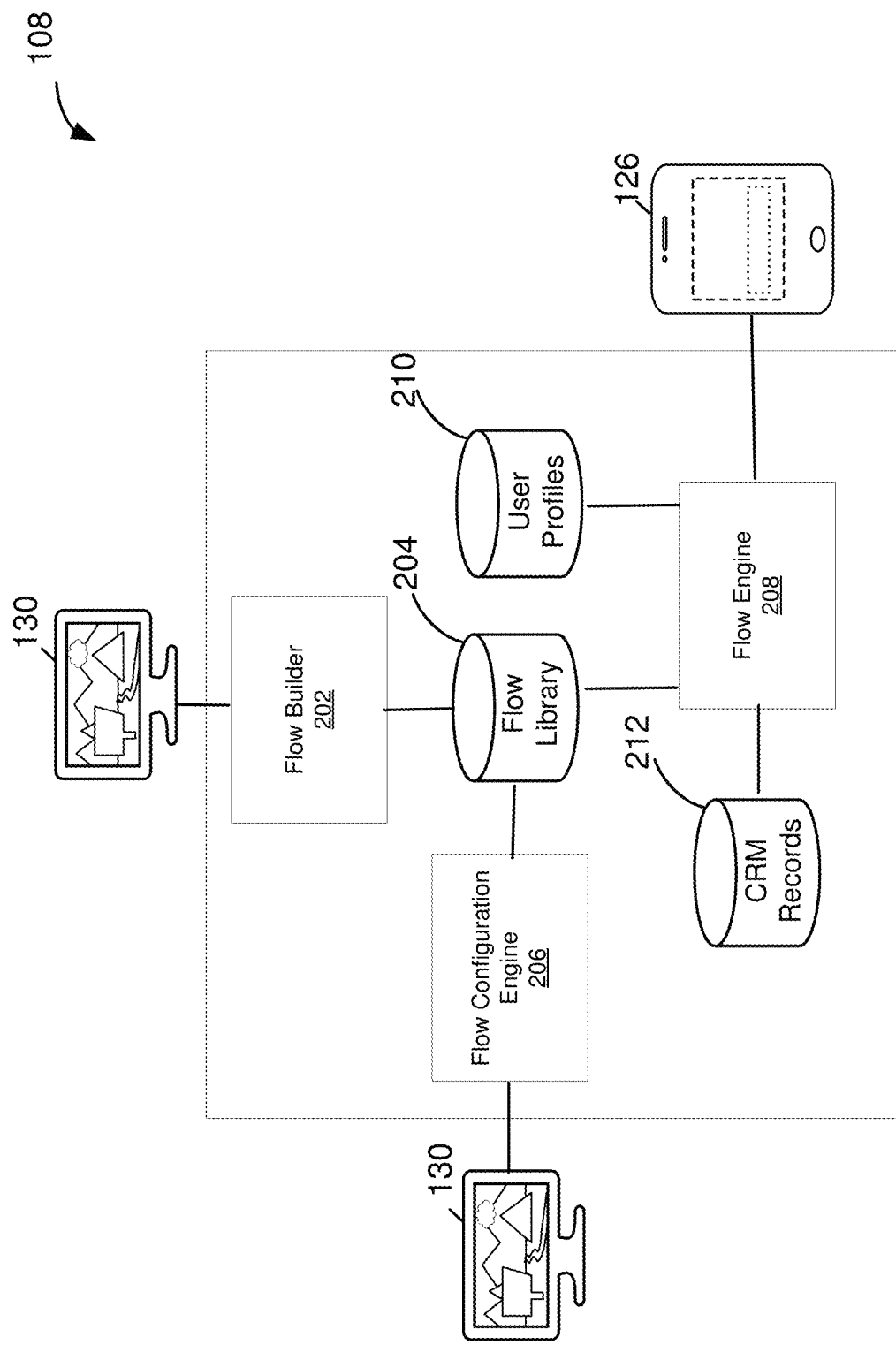
FIG. 2 shows a system diagram of an example of a flow management system 108, in accordance with some implementations.

FIG. 2 shows a system diagram of an example of a flow management system 108, in accordance with some implementations. Flow management system 108 can include a flow builder 202 that enables a flow to be generated using existing flows and other components. For example, an administrator or software developer may access flow builder 202 via computing device 130 to generate a flow including a plurality of elements. Flow builder 202 can generate a visual representation that represents the flow in the form of a plurality of interconnected nodes that correspond to the elements of the flow. The visual representation of the flow may be provided for display via computing device 130, enabling the flow to be easily modified using drag-and-drop operations. An example flow will be described in further detail.

Once generated, a flow may be stored in flow library 204. Each flow may be identified by a corresponding flow identifier. A flow may be stored in the form of a file that includes a set of computer-readable instructions. Flows in flow library 204 may be accessed according to their respective flow permissions. For example, flow permissions can identify specific groups or user roles within the organization. Flows in flow library 204 may be configured with permissions that limit flow access to authorized individuals, as described herein.

Flow configuration engine 206 enables an individual such as an administrator or software developer to configure flow permissions via computing device 130. Permissions may be stored in association with the respective flows in flow library 204 or in a separate location such as a file or database. Once configured, flow engine 208 may manage execution of flows according to flow configurations that include configured flow permissions. More particularly, a user may request execution of a flow via computing device 126 or, alternatively, another individual can request execution of the flow on behalf of the user.

Flow engine 208 can access the set of flow permissions associated with the flow and a profile of the user from user profiles 210 to determine whether the user is authorized to execute the flow. Upon determining that the user is authorized to execute the flow, flow engine 208 executes the flow.

During execution of the flow, flow engine 208 may execute computer-readable instructions corresponding to elements of the flow and execute the computer-readable instructions. In some instances, the order in which elements of the flow are traversed is determined, at least in part, on user selections during execution of the flow. For sub-flows configured with permissions, flow engine 208 may execute the sub-flows according to the permissions. In some implementations, permissions of parent flows are inherited by sub-flows.

Database records such as CRM records 212 may be accessed during execution of a flow. Access of a database record can include the performance of a create, update, read, or delete database operation on the database record. Access of a database record may result in the updating of the database record or an independent log file, as described herein. In some implementations, a database record or log file is updated to record an identity of the user in association with the corresponding database operation.

In some implementations, a flow may also be configured with an operation mode. In some instances, the user's permissions configured in their user profile may not permit the user to access database records that would be executed during execution of the flow. If the flow is configured with a system mode instead of a user mode, flow engine 208 may execute the flow according to escalated permissions while ignoring the user's permissions. In other words, database records such as CRM records 212 may be accessed independent of whether the user's permissions enable CRM records 212 to be accessed. Therefore, operation in system mode may result in escalation of user privileges of a user initiating the flow while preserving the identity of the user.

During execution of the flow, the flow can provide data for presentation via a client device 126 and/or receive data submitted via client device 126. For example, data can be submitted and/or presented via client device 126 in relation to a screen element of the flow. In addition, data generated by the flow can be provided for presentation via client device 126 upon completion of execution of the flow.

Flow engine 208 can gather flow performance data associated with the flow during execution of the flow and/or upon completion of execution of the flow, as will be described in further detail below. In addition, flow engine 208 can apply the flow performance data to generate or update flow metrics associated with the flow across a plurality of users accessing the flow 102. Flow metrics or an indication thereof can be provided for presentation via a display of a client device such as client device 130 and/or client device 126.

In some implementations flow metrics are generated and provided for display to users who are authorized to view the flow metrics. Flow metric permissions can be configured in a similar manner to flow configuration, as described herein.

Figure 3A:
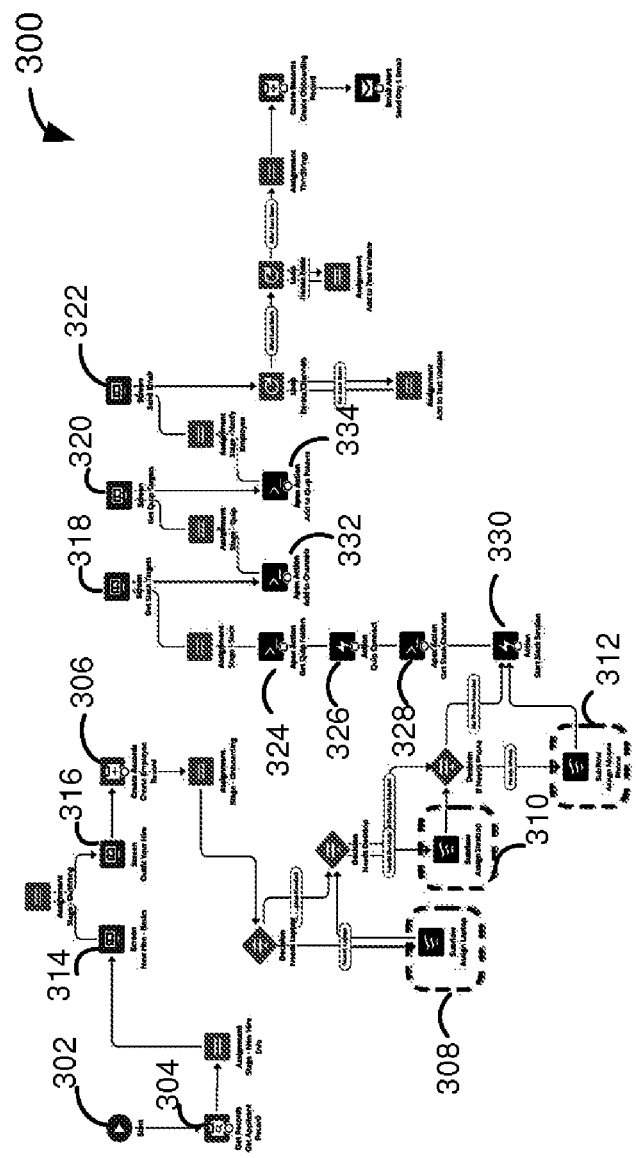
FIG. 3A shows a diagram of an example of a process flow 300 that may be executed, in accordance with some implementations.

FIG. 3A shows a diagram of an example of a process flow 300 that may be executed, in accordance with some implementations. As shown in this example, a representation of process flow 300 may be presented via a flow builder, enabling software designers and developers to easily build a flow using drag-and-drop operations. In this example, process flow 300 represents an onboarding process during which resources are assigned to a new employee. Other examples of process flows include, but are not limited to, surveys, login flows, training flows, and provisioning flows that provision resources to users. During execution of flow 300, records such as resource records pertaining to assignment of physical resources or applicant/employee records may be accessed.

Execution of a flow can be managed according to a corresponding flow configuration. More particularly, permissions configured in association with the flow can be accessed to determine whether a flow can be executed by or on behalf of a user. In addition, in some implementations, where a user's permissions do not permit access to records, a system mode configuration can override the user's permissions to enable execution of the flow to be initiated by or on behalf of the user.

During execution of flow 300, flow permissions and/or other configurations can be accessed for all sub-flows of parent flow 300 to ensure the user is permitted to access the corresponding sub-flows. In some implementations, flow permissions and/or other configurations of a parent flow can be inherited by sub-flows of the parent, enabling a user to access flow 300 even if configurations and/or permissions of sub-flows do not explicitly provide the user permission to access the sub-flows.

As shown in this example, a user may initiate the process by clicking on Start user interface object 302 via their computing device. The system accesses the permissions configured for flow 300 and a user profile of the user to determine whether the user can access flow 300. Upon determining that the user is permitted to access flow 300, the system proceeds to execute flow elements and any associated sub-flows, as shown in FIG. 3A.

In this example, it is assumed that sub-flows of parent flow 300 inherit the permissions configured for flow 300. More particularly, sub-flow "Get Records" 304 retrieves an applicant record for the user during execution of sub-flow 304, while sub-flow "Create Records" 306 creates an employee record for the user during execution of sub-flow 306. Resources including a laptop, desktop, and/or mobile phone may be assigned to the user by sub-flows 308, 310, 312, respectively. Therefore, database records may be accessed during a flow executed by a user based, at least in part, on permissions associated with the flow.

Screen elements 314-322 each represents a corresponding set of computer-readable instructions configured to provide a "screen" such as a GUI for display via a client device. For example, a screen can be rendered via a web page that includes the GUI. Screen elements 314-322 may represent sub-flows and/or individual steps within the flow. The GUI can be configured to obtain user input and/or present output for display via the GUI. In some instances, the output includes data obtained from database records. In other instances, the output may include data generated from database records. Screen elements 314-322 may enable a user to access and view data from database records based, at least in part, on flow permissions and/or other configurations. Therefore, screen elements 314-322 may provide data record access to the user regardless of whether user permissions configured in a user profile of the user explicitly enable the user to access the database records (e.g., via read, write, or read-write permissions).

One or more flow elements such as elements 324-334 may correspond to actions that do not access database records. For these flow elements, corresponding flows/sub-flows may not have associated permissions and/or operation mode configurations. For example, flow permissions would likely be considered irrelevant to a flow that posts a message to a social network. In some implementations, flow engine 208 need not determine an operation mode or permissions for elements 324-334.

Figure 3B:
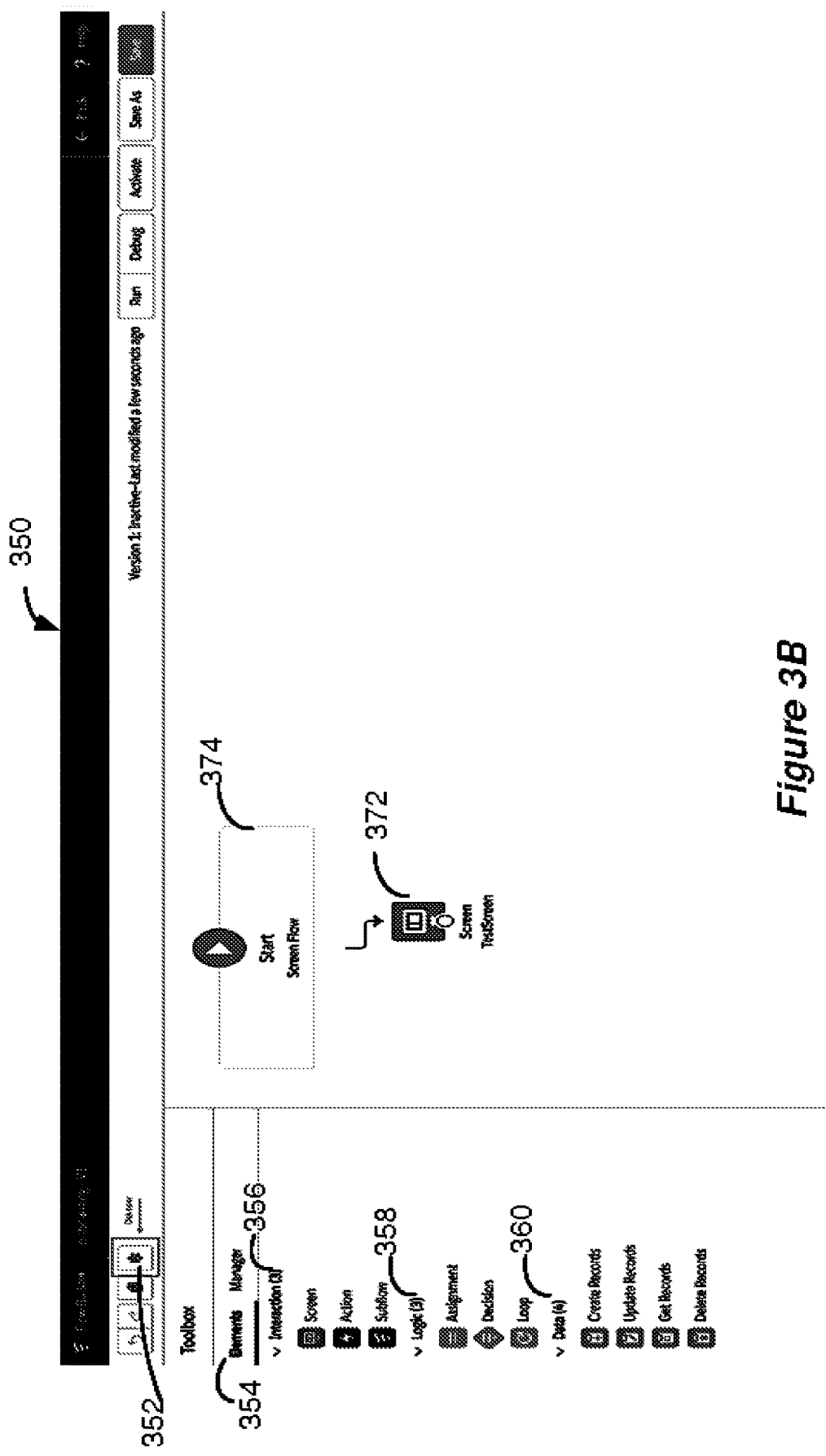
FIG. 3B shows an example of a graphical user interface (GUI) 350 via which a process flow may be configured, in accordance with some implementations.

FIG. 3B shows an example of a graphical user interface (GUI) 350 via which a process flow may be configured, in accordance with some implementations. In this example, a process flow may be configured via a Flow Builder that enables an administrator or software developer to configure a flow. Specifically, an administrator may select user interface object 352 to configure a designated flow 354. In some implementations, selection of user interface object 352 enables the administrator to configure permissions for a designated flow 354. In addition, in some implementations, the administrator may select user interface object 352 to configure an operation mode for a designated flow. For example, the administrator may configure the operation mode to be a system configuration mode To modify the flow, the administrator may add one or more flow elements 354 to the flow. This may be accomplished, for example, by dragging and dropping an element into the flow. Elements can include, but are not limited to, interaction elements 356, logic elements 358, and/or data elements 360. Interaction elements 356 can include, but are not limited to, screen elements, action elements, and/or sub-flow elements. Logic elements 358 can include, but are not limited to, assignment, decision, and/or loop elements. Data elements 360 can include, but are not limited to, create records, update records, get records, and/or delete records. For example, screen element 372 may be added to the flow by dragging and dropping a screen element from elements 354 into the flow. The flow may be executed within the context of the Flow Builder by clicking Start 374.

In response to selection of user interface object 352, a configuration interface may be provided for display by a client device. Example configuration interfaces will be described in further detail below.

In accordance with various implementations, a set of flow permissions can be configured for a set of flows. To simplify the following description, configuration is illustrated with respect to a single flow. However, these examples are merely illustrative, and a set of flow permissions may be configured for a set of flows including any number of flows. To configure a set of flow permissions, a user can select specific flow(s) to configure, as described in further detail below.

Figure 4:
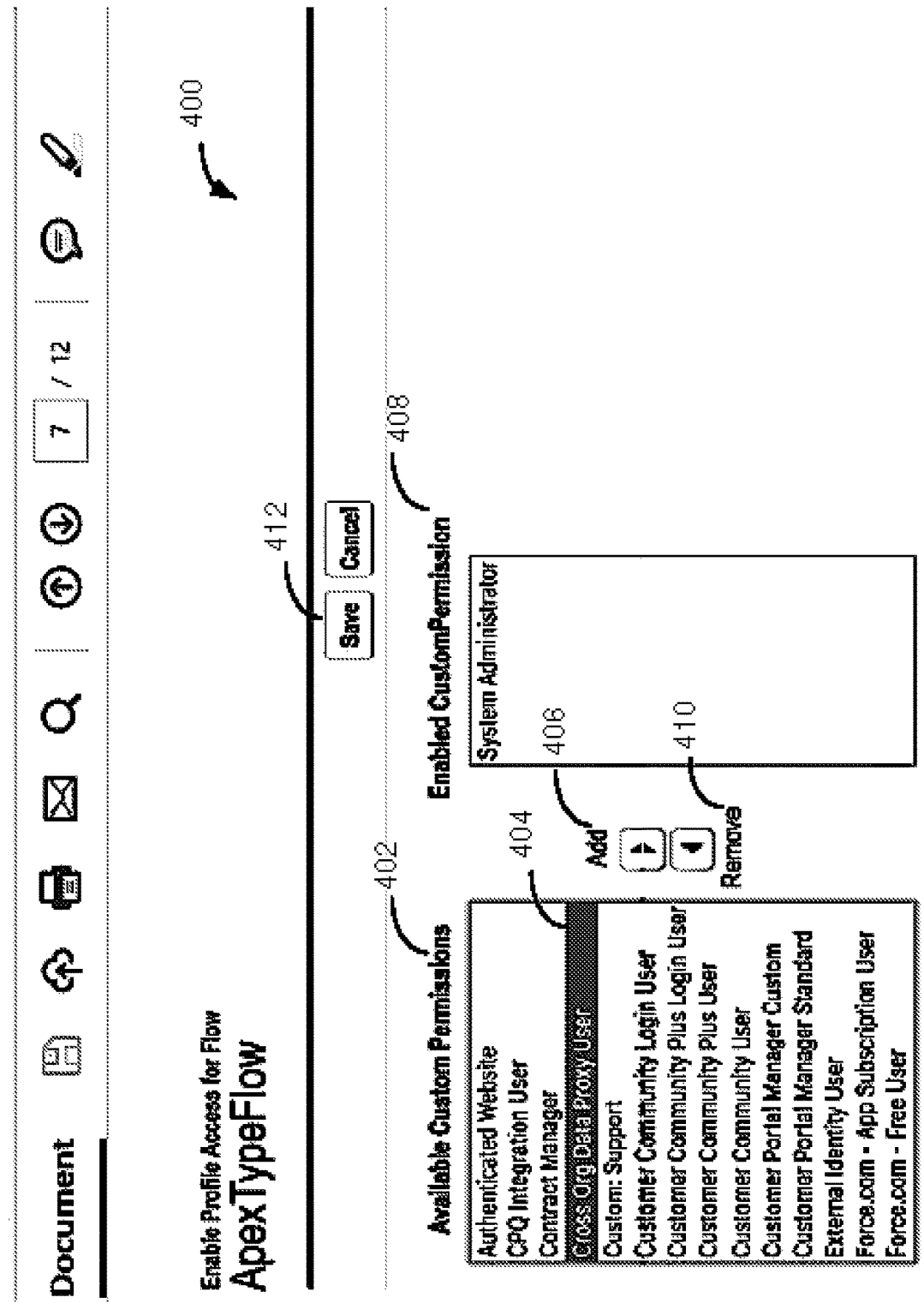
FIG. 4 shows an example of a GUI 400 via which a set of flow permissions may be configured for a flow, in accordance with some implementations.

FIG. 4 shows an example of a GUI 400 via which a set of flow permissions may be configured for a flow, in accordance with some implementations. In this example, a set of flow permissions associated with a flow, ApexTypeFlow, is configured using a set of user-selectable permissions options. In this example, user-selectable permissions options include user-selectable flow permissions 402. Specifically, to configure a set of flow permissions associated with the flow, an administrator can select one or more of the user-selectable permissions options by selecting one or more flow permissions from user-selectable flow permissions 402, as shown at 404. The administrator can choose to add the selected permission(s) to a set of flow permissions 408 associated with the flow via interaction with a user interface object 406. The added flow permission(s) can be added to the set of flow permissions 408 associated with the flow. Similarly, the administrator can choose to remove one or more permissions from set of flow permissions 408 via interaction with a corresponding user interface object 410. The administrator can choose to save set of flow permissions 408 in association with the flow by interacting with a corresponding user interface object 412.

User-selectable flow permissions can identify or correspond to various permission setting options such as profile types, user types or characteristics, user roles, user groups, departments, organizations (e.g., customers), and/or individual users. For example, a profile type can identify or otherwise correspond to a role (e.g., job title or other role within an organization), a user group, or department within the organization. In some implementations, an organization can be identified as a tenant of a multi-tenant database.

Figure 5A:
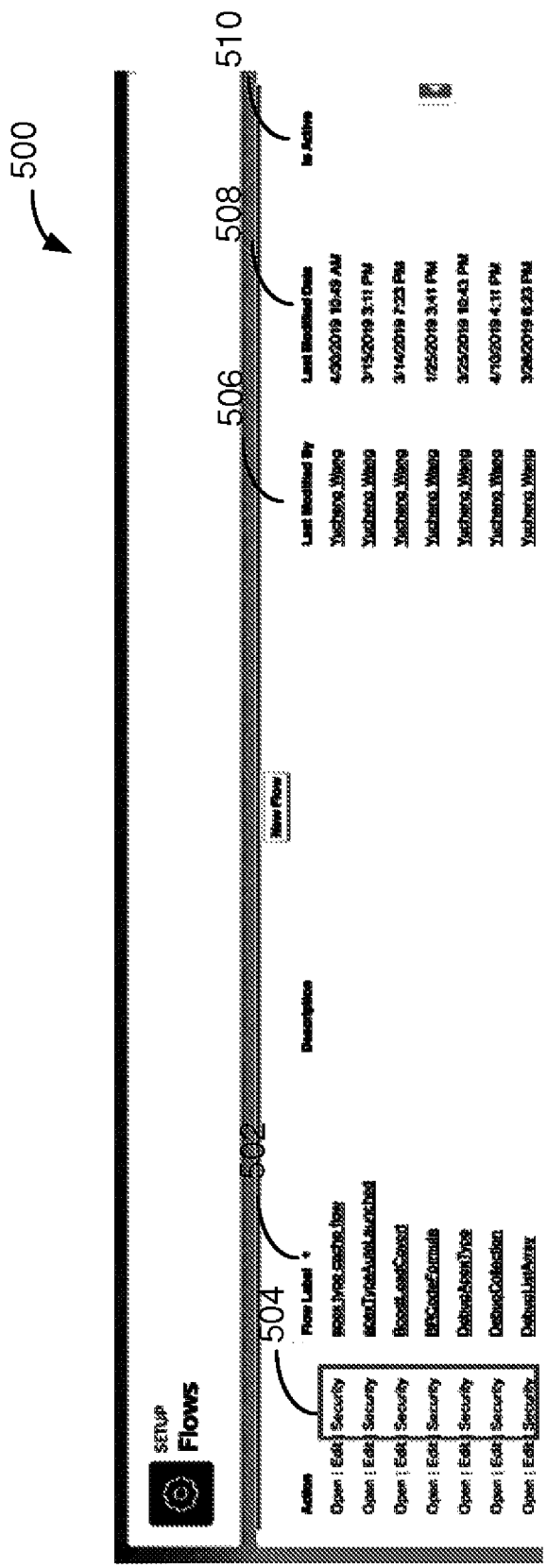
FIG. 5A shows an example of GUI 500 via which a process flow may be configured, in accordance with various implementations.

FIG. 5A shows an example of GUI 500 via which a process flow may be configured, in accordance with various implementations. In this example, a user can choose to configure a set of flow permissions associated with a flow 502 by selecting a security user interface element 504. GUI 500 can identify a user 506 that last modified the set of flow permissions for flow 502, as well as a date 508 that the set of flow permissions were last modified. A flow 502 can be activated or deactivated via interaction with a corresponding user interface element, as shown at 510.

Responsive to selecting a security user interface element 504, a user interface enabling flow permissions to be configured may be rendered. An example of such a user interface will be described below with reference to FIG. 5B.

Figure 5B:
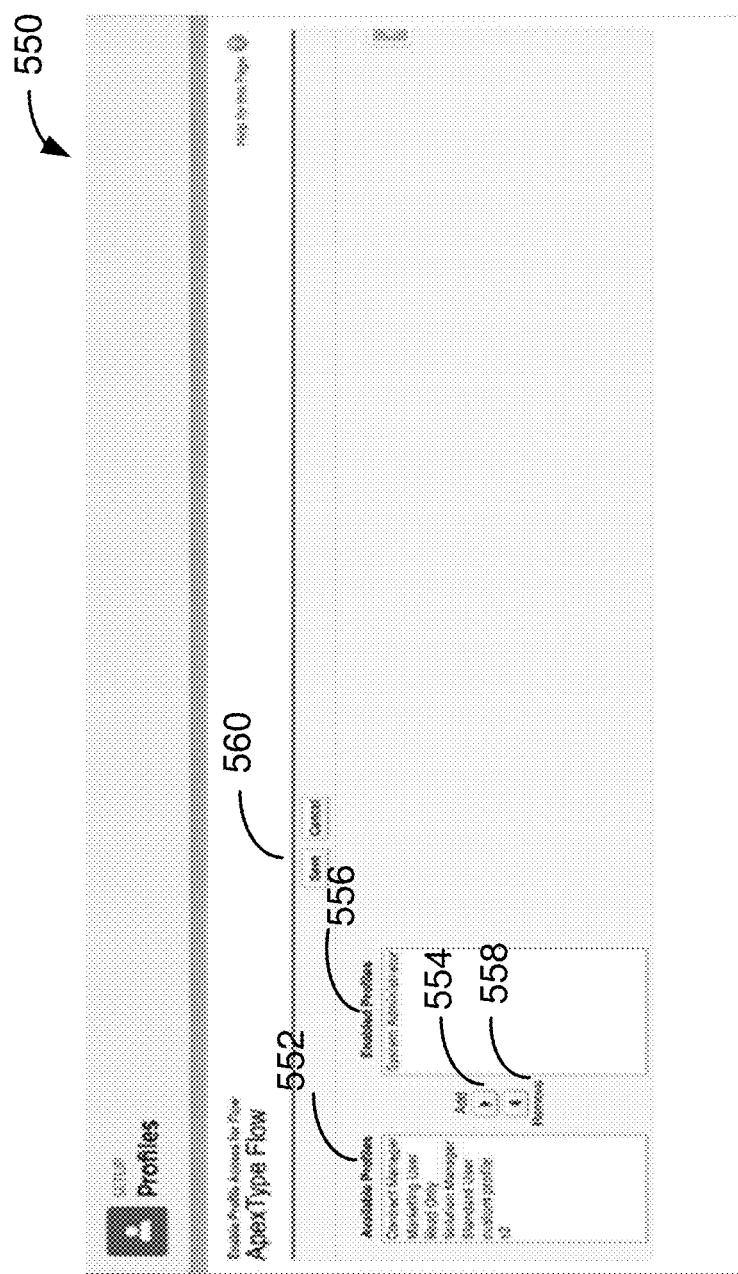
FIG. 5B shows an example of a GUI 550 for enabling profile access for a flow, in accordance with some implementations.

FIG. 5B shows an example of a GUI 550 for enabling profile access for a flow, in accordance with some implementations. In this example, a set of flow permissions associated with a flow, ApexTypeFlow, can be configured using a set of user-selectable profile types 552. Specifically, to configure a set of flow permissions associated with the flow, an administrator can select a profile type from user-selectable profile types 552. The administrator can then choose to add the selected profile type to a set of flow permissions 556 associated with the flow via interaction with a user interface object 554. Similarly, the administrator can choose to remove a profile type from set of flow permissions 556 via interaction with a corresponding user interface object 558. The administrator can then choose to save set of flow permissions 556 in association with the flow by interacting with a corresponding user interface object 560.

As discussed above, a profile type can identify or correspond to a user type or user role within the organization. For example, a profile type can include a Contract Manager or External Identity user. A user type can correspond to hardware, software, and/or data of the database system that can be accessed by the user or that is currently being accessed by the user. In addition, a user type can indicate a level of permissions associated with access to hardware, software, and/or data of the database system. For example, a user type can correspond to a user having "Read Only," Read, Write, or Read-Write permissions to access data such as database records accessed by the flow during runtime. In some implementations, a profile type can indicate a context in which the user is permitted to access the database system or flow In some implementations, user-selectable permissions options can include an option having an associated condition. In other words, the set of flow permissions that is applied may be conditional. Stated another way, the set of flow permissions that is applied during run-time may depend upon whether the condition is satisfied. The condition may be a default condition or may be configured via selection or definition of the condition via a corresponding GUI.

In some implementations, a flow engine may select the set of flow permissions or a portion thereof dynamically during run-time from two or more options based, at least in part, on a condition established via the permissions configuration. For example, the sets of flow permissions may include a first set of flow permissions if the condition is not satisfied and include a second set of flow permissions if the condition is satisfied. In some instances, the set of flow permissions may be determined based, at least in part, on a context in which the corresponding flow is launched.

Metrics can be generated for a flow based upon performance data that is collected across a plurality of users accessing the flow. These metrics can be provided for presentation via a client device.

Figure 6A:
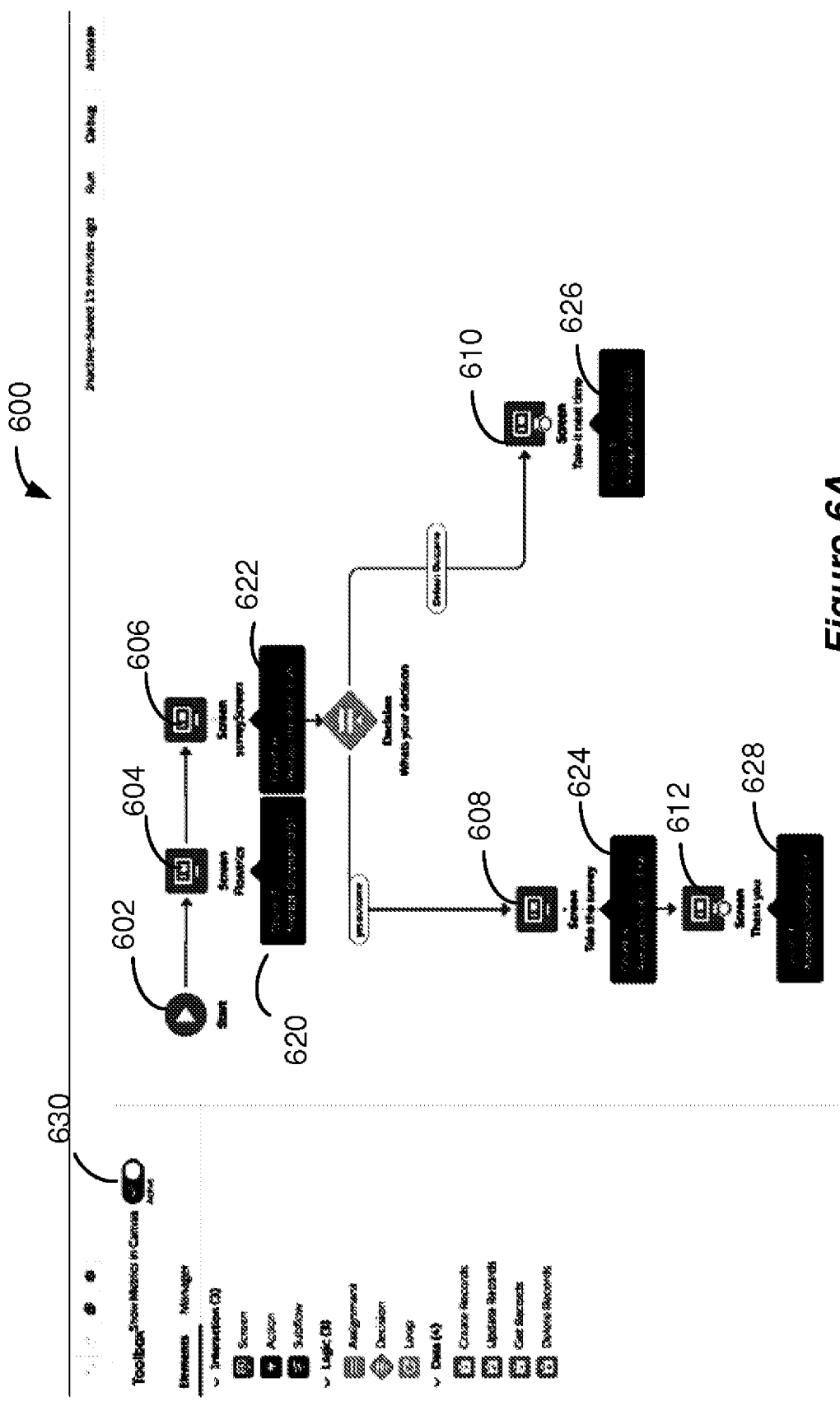
FIG. 6A shows a block diagram of an example of a GUI 600 via which flow metrics may be presented within the context of a flow, in accordance with some implementations.

FIG. 6A shows a block diagram of an example of a GUI 600 via which metrics may be presented within the context of a flow, in accordance with some implementations. As shown in this example, metrics can be presented within the context of a Flow Builder. Specifically, metrics can include a plurality of sets of metrics, where each set of metrics is associated with a different one of a plurality of elements or steps of a flow. Metrics can be presented during or after completion of execution of the flow.

As shown in this example, execution of a flow can be initiated via interaction by a user with a user interface object

602. For each of flow elements 604-612, a corresponding set of metrics can be presented as shown at 620-628. Each set of metrics or subset thereof 620-628 can be presented in close proximity to a user interface element representing a corresponding flow element 604-612. By presenting flow metrics within the context of the corresponding flow, this enables an administrator to visualize the impact of hardware or software conditions represented by the metrics on other steps or sub-flows of the flow.

In this example, flow elements 604-612 are screen elements. Metrics presented in association with a flow element such as a screen element can include an average duration of time for which a corresponding GUI is displayed or viewed by users accessing the flow before proceeding to the next step or screen. In addition, metrics can include an average count of the number of times the flow element (e.g. GUI) was accessed (e.g., navigated to) during execution of the flow by users of the database system.

In this example, a user may interact with user interface element 630 to view metrics within the context of the Flow Builder. If the user no longer wishes to view the metrics, the user may interact again with user interface element 630. Thus, by toggling user interface element 630, metrics may be displayed or cleared from GUI 600.

In some implementations, a report is generated for one or more flows. The report can include metrics generated in association with a flow and/or performance data collected in association with the flow.

Figure 6B:
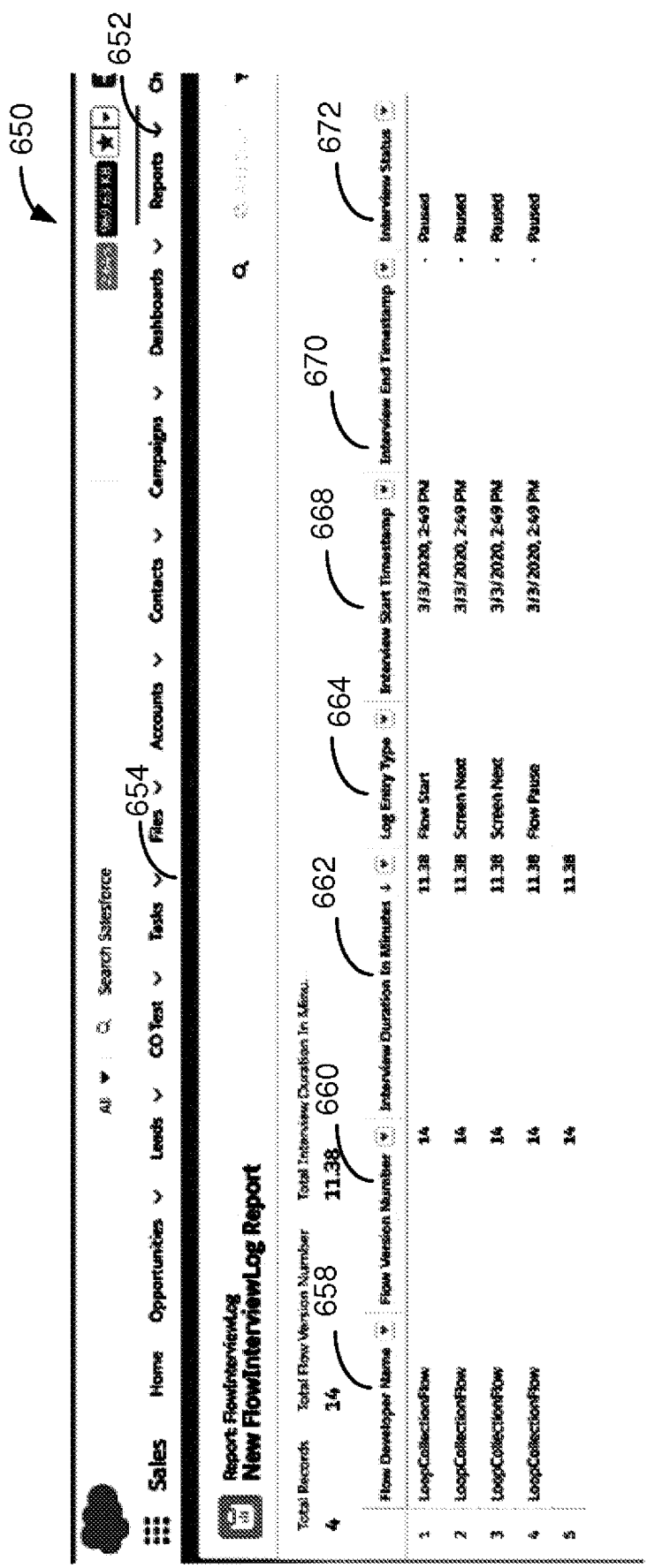
FIG. 6B shows an example of a GUI 650 including a report generated for a flow, in accordance with some implementations.

FIG. 6B shows an example of a GUI 650 including a report presenting metrics generated for a flow, in accordance with some implementations. As shown in this example, to access or generate a report, a user can select a Reports option by interacting with a user interface object such as tab or button, as shown at 652. A report 654 can include a log report that represents flow performance data that has been collected for a flow and stored in a log file.

In this example, report 654 represents a log report that includes information collected during execution of a flow, LoopCollectionFlow, and maintained in a corresponding log file. As shown in FIG. 6B, report 654 includes a plurality of entries. Each of the entries can correspond to an entry in the log file. For each instance that the flow is accessed, one or more entries may be generated.

Report 654 can include a flow identifier 658. Report 654 can also indicate a version number 660 associated with the flow. Report 654 can indicate a duration 662, which can correspond to execution of the entire flow, a specific step of the flow as represented by an element of the flow, or a sub-flow represented by an element of the flow. Report 654 can further indicate a log entry type 664 indicating a corresponding element of the flow or user interaction with the flow, which can trigger generation of a log file entry. For example, log entry type 664 can indicate that the user started the flow, paused the flow, or advanced to the next screen. In addition, report 654 can further indicate a start timestamp 668 and an end timestamp 670. A status 672 can indicate a status of the flow. Status 672 can correspond to end timestamp 670.

Information maintained in a report such as that shown in FIG. 6B can include flow performance data and/or can be used to generate flow performance data associated with each instance the flow is accessed. The flow performance data for individual flows can be used to generate or update flow metrics that reflect flow performance across a plurality of users.

A report that is generated can include metrics calculated for multiple flows based upon access to those flows by users of the database system. In some implementations, a report presents metrics via one or more graphical representations. For example, a report can include a pie chart, bar chart, or graph.

Figure 6C:
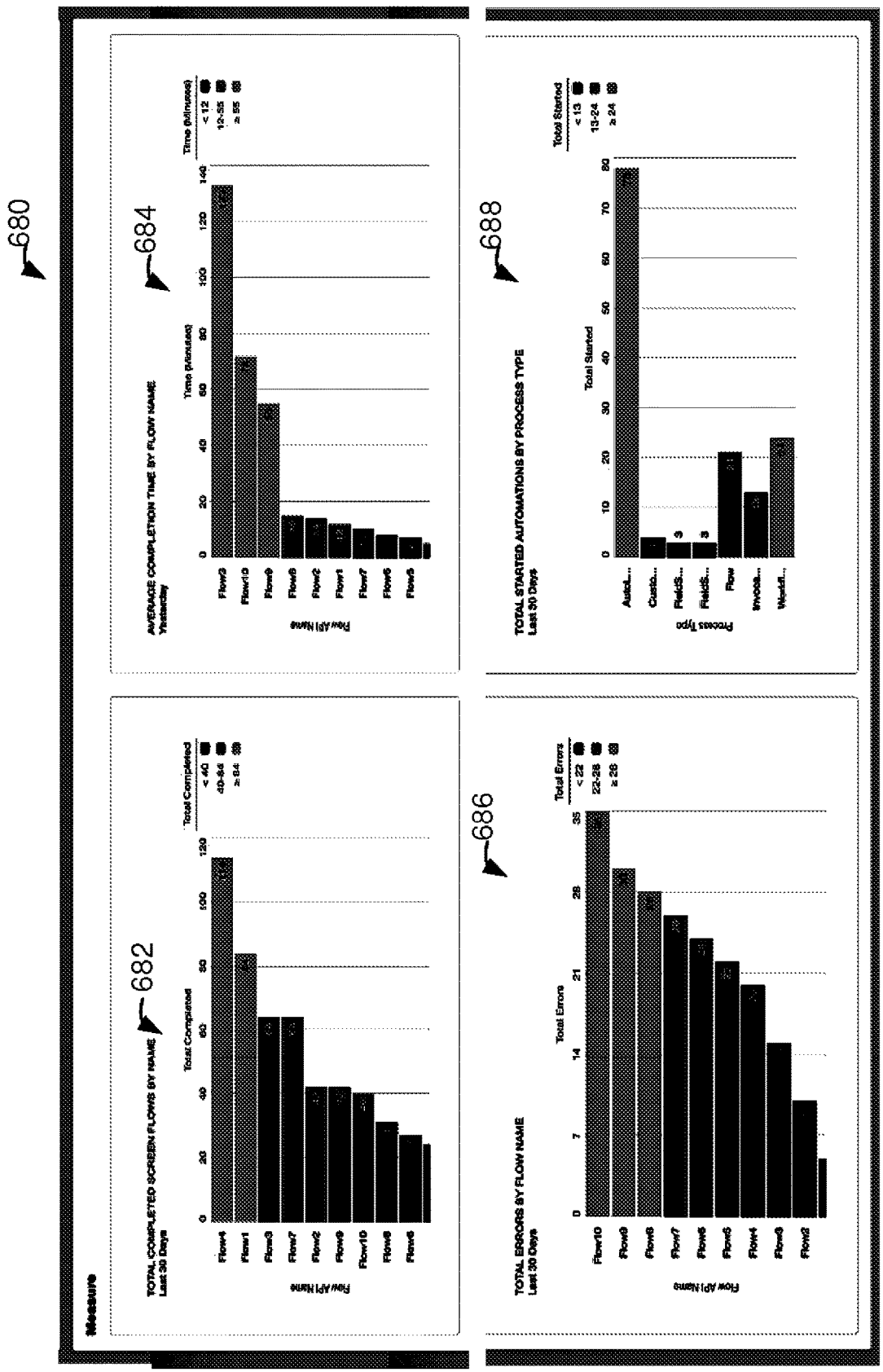
FIG. 6C shows an example of a GUI 680 including graphical representations of metrics generated for corresponding flows, in accordance with some implementations.

FIG. 6C shows an example of a GUI 680 including examples of graphical representations of metrics generated for corresponding flows, in accordance with some implementations. More particularly, bar chart 682 shows, for each flow, a total number of times that the flow was completed within a period of time (e.g., 30 days). Bar chart 684 shows, for each flow, an average completion time for all instances that the flow was completed within a period of time. Bar chart 686 shows, for each flow, a total number of errors that occurred during execution of the flow within a period of time (e.g., 30 days). Bar chart 688 shows, for each flow, a total number of started automations by process type or flow type.

The reports and graphical representations described above are merely illustrative. Therefore, other types of reports and representations may be implemented for presentation of metrics associated with process flows.

Figure 7A:
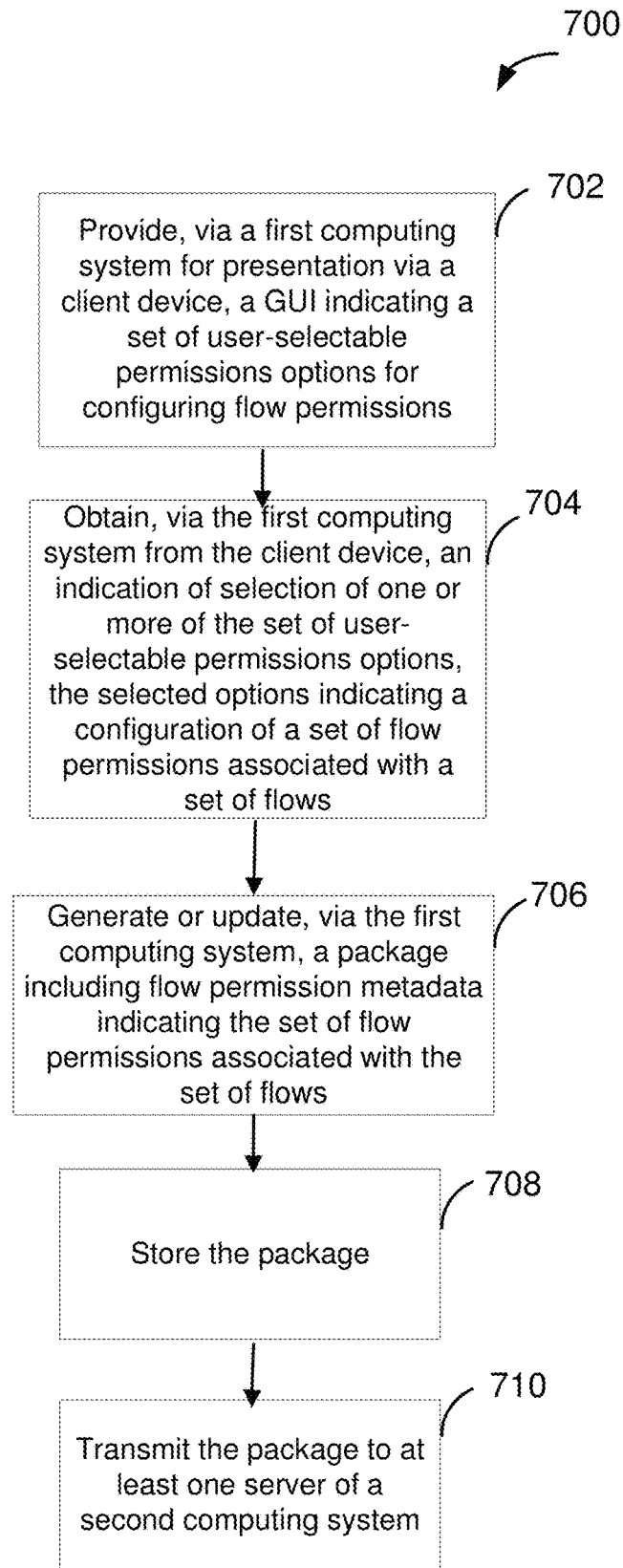
FIG. 7A shows an example of a method 700 for facilitating configuration for granular process flow control, in accordance with some implementations.

FIG. 7A shows an example of a method 700 for facilitating configuration for granular process flow control, in accordance with some implementations. A GUI is provided at 702 via a first computing system including one or more servers for presentation via a client device, where the GUI indicates a set of user-selectable permissions options for configuring flow permissions. The first computing system obtains an indication of user selection of one or more of the set of user-selectable permissions options from the client device at 704, where the selected options indicate a configuration of a set of flow permissions associated with a set of flows. Each flow can include a plurality of elements, where each of the elements corresponds to a set of computer-readable instructions. The first computing system may save the set of flow permissions in association with the set of flows.

The first computing system generates or updates a package including a flow permission metadata indicating the set of flow permissions associated with the set of flows at 706. In some implementations, a package can include a container or data structure that can be distributed to systems, organizations, users, and/or client devices. For example, a package can include one or more data structures, directories, folders, files, and/or web addresses (e.g., URLS). In some implementations, the package is generated or updated to include the set of flows or an identification thereof. For example, the package can include a flow name of a flow in the set of flows, a flow label, a web address associated with the flow and/or computer-readable instructions associated with the flow that enables the flow to be executed.

The first computing system can store the package at 708. The package can include flow metadata including the flow permission metadata. For example, the package can include an Extensible Markup Language (XML) file that stores the flow metadata. In some instances, the package can also include flow(s), as described herein.

The package can be generated or updated automatically by the first computing system. For example, the first computing system can generate or update the package responsive to obtaining the indication of the selection of permissions options. Alternatively, the package can be generated or updated responsive to a manual command received from the client device.

The package can be applied by the first computing system to implement granular process flow control. In addition or alternatively to applying the package within the first computing system, the first computing system can transmit the package to at least one server of a second computing system at 710. The second computing system can apply the set of flow permissions to implement granular process control, as described in further detail below with reference to FIG. 7B. In addition, the second computing system can enable the set of flow permissions associated with the set of flows to be modified, as described herein.

By distributing the package to other servers or server clusters, this enables flow-specific permissions to be distributed and deployed. This can be particularly advantageous where flow permissions are configured and deployed within an organization or among organizations. For example, by distributing the package to customer organizations, software services can be customized and distributed with associated granular flow permissions.

In some instances, it may be desirable to use flow permissions to disable a particular flow or set of flows. For example, a flow may have an associated security concern or be inoperable.

Figure 7B:
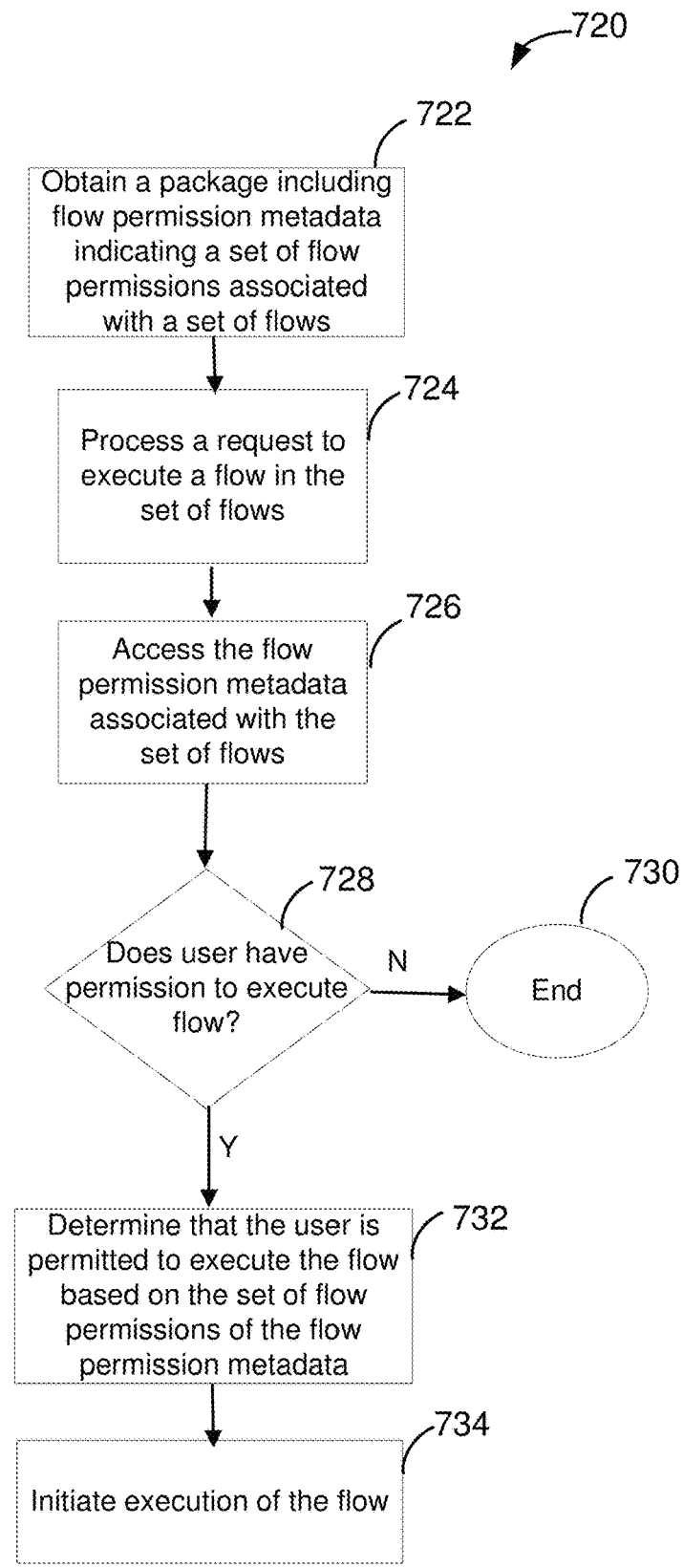
FIG. 7B shows an example of a method 720 for facilitating granular process flow control, in accordance with some implementations.

Once generated or updated, a package indicating a set of flow permissions can be applied to facilitate granular process control. FIG. 7B shows an example of a method 720 for facilitating granular process flow control, in accordance with some implementations. The system obtains a package at 722, where the package includes flow permission metadata indicating a set of flow permissions and associates the set of flow permissions with a set of one or more flows. The set of flow permissions can indicate one or more of: one or more profile types permitted to access the flows, one or more user types permitted to access the flows, one or more user roles permitted to access the flows, one or more organizations permitted to access the flows, one or more organizational user groups permitted to access the flows, one or more organizational departments permitted to access the flows, or one or more specific users permitted to access the flows. As described above, the package can be obtained via generation of the package or receipt of the package upon transmission from another system. Where the package is obtained upon transmission from another system, the package can be processed and the flow permission metadata and any associated flows can be stored. For example, the flow permission metadata and any flow files can be downloaded, as appropriate.

In some implementations, the flow permission metadata can be generated by the system or updated after receipt from another system. For example, the flow permission metadata may be configurable by an individual in an administrative capacity. Specifically, the system can provide, for presentation via a display, a plurality of user-selectable permission options and responsive to processing an indication of a selection of one or more of the user-selectable permission options, generate or update the flow permission metadata, as described herein. The flow permission metadata can be updated by updating the set of flows of the flow permission metadata (e.g., by adding or removing a particular flow from the set of flows) or updating the set of flow permissions of the flow permission metadata (e.g., by adding a flow permission to the set of flow permissions or removing a flow permission from the set of flow permissions).

In some implementations, the package also includes computer-readable instructions associated with the set of flows. Upon processing of the package, the computer-readable instructions associated with the set of flows can be obtained and stored for subsequent retrieval or access.

A user may submit a request to initiate execution of a flow or another individual may submit the request on behalf of the user. For example, the user may click on or select "Start" for the flow. Alternatively, the flow may be initiated responsive to a specific trigger or event. A trigger may be generated according to a schedule, user action, or system event.

A request to execute a flow of the set of flows, received via a client device, is processed at 724. The request can include or otherwise indicate an identity of the user and an identity of the flow. The flow can include a plurality of elements, where each of the elements corresponds to a set of computer-readable instructions.

A flow engine may determine the set of flow permissions assigned to the flow (e.g., using the flow permission metadata of the package) and execute the set(s) of computer-readable instructions corresponding to the flow according to the set of flow permissions, as described below. Specifically, responsive to processing the request to execute the flow, the flow engine may determine whether the user is permitted to execute or otherwise access the flow based, at least in part, on the set of flow permissions associated with the flow. Specifically, the flow permission metadata associated with the set of flows can be accessed at 726 and a determination can made as to whether the user has permission to execute the flow based upon the set of flow permissions of the flow permission metadata at 728. If the user does not have permission to execute the flow, the process ends at 730.

In this example, the system determines that the user is permitted to execute the flow at 732 based, at least in part, on the set of flow permissions. In some implementations, the system may determine that the user is permitted to execute the flow further based, at least in part, on a user profile of the user. For example, the user profile can indicate one or more of: a particular profile type of the user, a particular user type of the user, a particular user role of the user, a particular user group of which the user is a member, a particular organization of which the user is a member, a particular organizational department that includes the user, or an identity of the user. Responsive to determining that the user is permitted to execute the flow, the system initiates execution of the flow at 734.

During execution of the flow, user input may be submitted via a GUI corresponding to a screen element of the flow. An operation on a database record may be performed using the input. More particularly, a database record may be created, updated, or deleted based, at least in part, on the user input. Alternatively, data may be retrieved from a database record and rendered via a GUI for display by the client device. For example, the data may correspond to an Account, Contact, or Case.

In some implementations, an autofill or prepopulate function may prefill a field of a web page or form rendered via a screen element with data retrieved from a database record. This may be useful, for example, in situations where the data includes the user's personal data, brands of smart phones or laptops available for assignment to the user, or user-selectable options that may be selected by the user during a process such as an onboarding process.

In addition, a flow element can correspond to a sub-flow. A sub-flow can be processed as an individual flow, as described herein. Alternatively, it may be assumed that a sub-flow inherits the permissions associated with a parent flow.

Figure 7C:
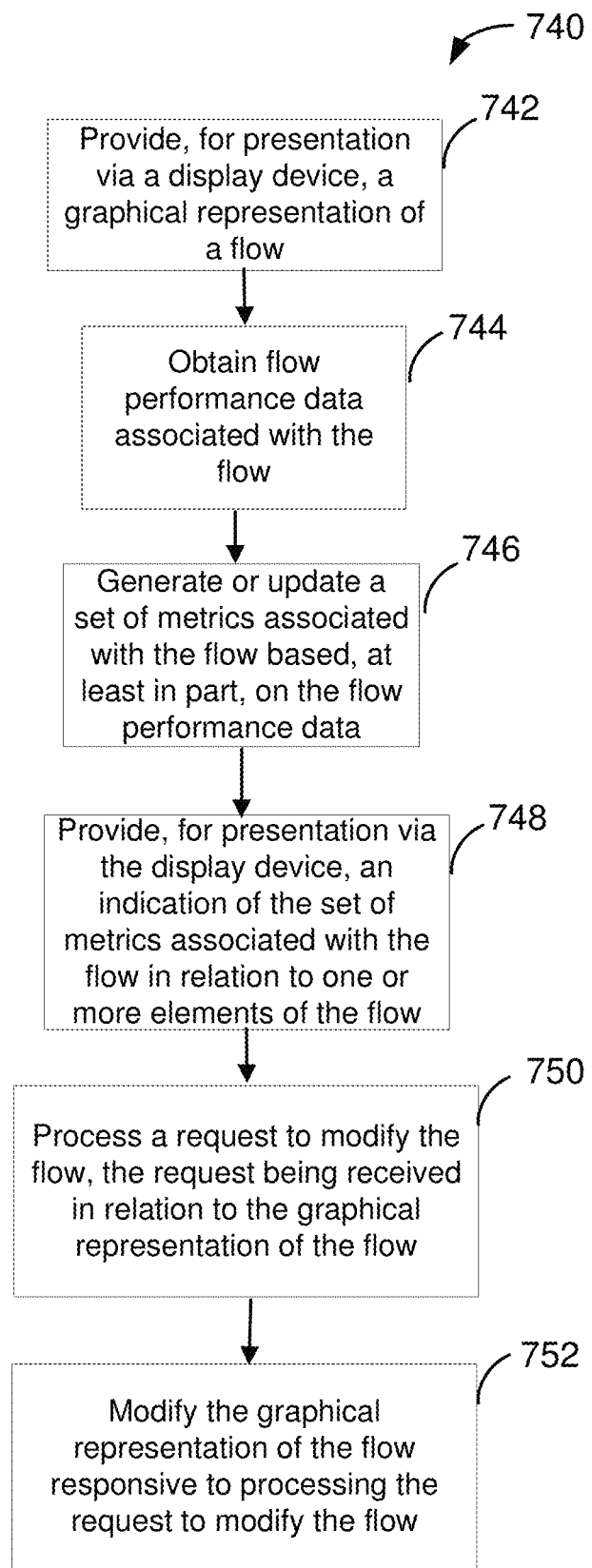
FIG. 7C shows an example of a method 740 for presenting flow metrics within a process flow builder, in accordance with some implementations.

FIG. 7C shows an example of a method 740 for presenting flow metrics within a process flow builder, in accordance with some implementations. In some implementations, a user accesses a process flow builder application configured to render a GUI that enables process flows to be selected, generated, viewed, and modified interactively, as detailed below. From within the process flow builder application, the user can select a flow that the user wishes to view from a plurality of user-selectable flows. Alternatively, the user may enter the name of the flow to access the flow.

The system can provide, for presentation via a display device, a graphical representation of the flow selected by the user at 742. For example, the graphical representation of the flow can be presented within the GUI rendered by the process flow builder. In some implementations, the graphical representation of the flow is provided responsive to processing a request, received via an application programming interface (API), from a client device. For example, the request can be transmitted in response to the user selection of the flow. As described above, a flow can include a plurality of elements, where each of the elements corresponds to a set of computer-readable instructions. Thus, the graphical representation of the flow can include visual representations of elements of the flow. Within the flow builder, the user may view flow metrics that are pertinent to elements of the flow. For example, the user may choose to enable flow metrics by interacting with a corresponding user interface element of the GUI. In some implementations, the user interface element operates as a toggle switch that renders flow metrics when in a first state and does not render flow metrics in a second state.

Flow metrics can be generated prior to access of the flow builder by the user or after the flow builder has been accessed. For example, flow metrics can be generated after the flow has been selected, the graphical representation of the flow has been provided, or responsive to the enabling of the metric presentation feature. As another example, flow metrics can be generated on-the-fly responsive to interaction by the user with the graphical representation of the flow or associated user interface element(s). During execution of the flow by a flow engine, flow performance data can be generated and stored. For example, event data associated with a plurality of events occurring during execution of the flow can be collected and stored in a database. The flow performance data can include or be derived from the event data. Event data can identify events occurring during execution of the flow. Example events include, but are not limited to, Started, Continued, Stopped, Error, Pause, Resume, Next, and Back. In addition, event data can include a time stamp indicating a time at which each step of the flow was executed, as well as an indication of a time of duration of step(s) of the flow. The event data can also include an identifier of a user that executed the flow.

While flow performance data is associated with a single instance of the flow, metrics associated with the flow are derived based upon flow performance data across multiple instances of execution of the flow. In other words, the set of metrics represents execution of the flow across a plurality of users of the database system.

Flow performance data associated with the flow can be obtained at 744. Specifically, flow performance data can be obtained for one or more instances of execution of the flow. For example, one or more paths of the flow that have been traversed can be ascertained, where each of the paths corresponds to one or more of the elements of the flow. Flow performance data can be stored in a log file and/or generated using data retrieved from the log file. For example, a length of time that expired during execution of the flow can be calculated based upon start and end timestamps corresponding to a start and completion of execution of the flow. As another example, an amount of time a user viewed a screen associated one of the elements of the flow can be calculated based upon start and end timestamps representing a start time that the screen was displayed and an end time at which the screen is no longer displayed. For example, the end time can reflect a time that a next step or screen was selected by the user or a time that a next screen was displayed.

Flow performance data can include data that is collected or generated during execution of the flow and/or upon completion of execution of the flow. For example, flow performance data can include start and end timestamps, duration of execution, an amount of time spent by a user on a particular GUI (e.g., screen), number of times a user navigated to a particular GUI associated with one of the elements of the flow, a number of errors that have occurred during execution of the flow, identification of path(s) selected during execution of the flow, and/or time that elapsed during traversal of individual paths. For example, path(s) of the flow that have been traversed can be tracked and identities of the paths can be recorded in a log file, where each of the paths corresponds to one or more of the elements of the flow.

A set of metrics associated with the flow can be generated or updated based, at least in part, on the flow performance data at 746. For example, the set of metrics can be generated or updated using flow performance data associated with multiple instances of execution of the flow. The set of metrics can indicate, for each of the one or more paths of the flow, one or more metrics collected across a plurality of users of the database system that accessed the flow, where each of the paths of the flow corresponds to a subset of the plurality of elements of the flow. For example, the set of metrics can indicate, for each of a plurality of paths of the flow, a frequency with which the corresponding path is traversed across a plurality of users of the database system. Other examples of metrics include, but are not limited to, an average duration of execution of the flow, an average time during for which a particular screen is displayed (e.g., an average time that users spent viewing the screen), an average number of errors that have occurred during execution of the flow, identification of path(s) selected during execution of the flow, most commonly selected paths selected during execution of the flow, and/or an average time that elapsed during traversal of individual paths.

The set of metrics can be generated, updated, or otherwise obtained, at least in part, responsive to processing a request, received via an application programming interface (API), from a client device. For example, the request can be transmitted responsive to a user selecting the flow via the flow builder application. As another example, the request can be transmitted responsive to the user selecting the "toggle switch" to render the metrics in relation to the selected flow.

To obtain the set of metrics, the API can query the database for flow performance data and/or previously generated metrics. In some implementations, the set of metrics is generated in real-time during execution of the flow builder.

An indication of the set of metrics associated with the flow can be provided for presentation via a display at 748. More particularly, the set of metrics or a portion thereof may be provided via a GUI that includes representations of the flow elements. For example, an indication of the set of metrics or portion thereof can be presented via at least one graphical user interface element presented within the context of the flow, where the indication is provided in proximity to a representation of at least one of the elements of the flow. An individual element of the flow can be represented by a node within the representation, while the transition between elements of the flow can be represented by a line within the representation. In some implementations, an indication of the set of metrics associated with the flow is provided in relation to one or more elements of the flow such that at least a first portion of the set of metrics is provided for presentation in close proximity to a visual representation of a first one of the elements of the flow and a second portion of the set of metrics is provided for presentation in close proximity to a visual representation of a second one of the elements of the flow.

In addition, the set of metrics or a portion thereof may be provided for presentation via a report. In some implementations, a report can be accessed via a web page and rendered via a display of a client device.

The set of metrics can be used for troubleshooting. For example, a system administrator can use the set of metrics to identify bugs in computer-readable code associated with flows or problematic hardware, as well as delays or inefficiencies that may be perceived by users while accessing the flows. By identifying anomalies or inefficiencies that occur during execution of flows, administrators can more readily identify sources of these issues. As a result, metrics enable administrators to identify and correct issues related to performance of hardware or software. Administrators can replace or update problematic hardware or software or, alternatively, make recommendations for these changes. For example, administrators can address issues identified in flows by updating computer-readable code associated with flows. In some instances, flows can be updated via addition of a new flow element, revision of a flow element, or removal of a flow element. Therefore, metrics that are generated can be applied to improve system performance, as well as the experience of users accessing the system.

In accordance with various implementations, upon identification of performance issues based upon the metrics presented via the flow builder, the user may choose to modify the flow using, for example, a drag-and-drop operation. For example, the user may choose to remove an element of the flow, add an additional element to the flow, or change a position of one of the elements of the flow. The system can process a request to modify the flow at 750, where the request is received in relation to the graphical representation of the flow. More particularly, the request to modify the flow can include an indication of an additional element to add to the flow at a particular position within the flow, an indication of removal of one of the elements of the flow, or an indication of a change in position of one of the elements of the flow from an existing position within the flow to a modified position within the flow.

The system can modify the graphical representation of the flow responsive to processing the request to modify the flow at 752. In addition, the system can store a modified flow that reflects the modified graphical representation of the flow. For example, the system can store the modified flow responsive to the user selecting a "Save" option (e.g., by interacting with a corresponding user interface element of the GUI).

Figure 7D:
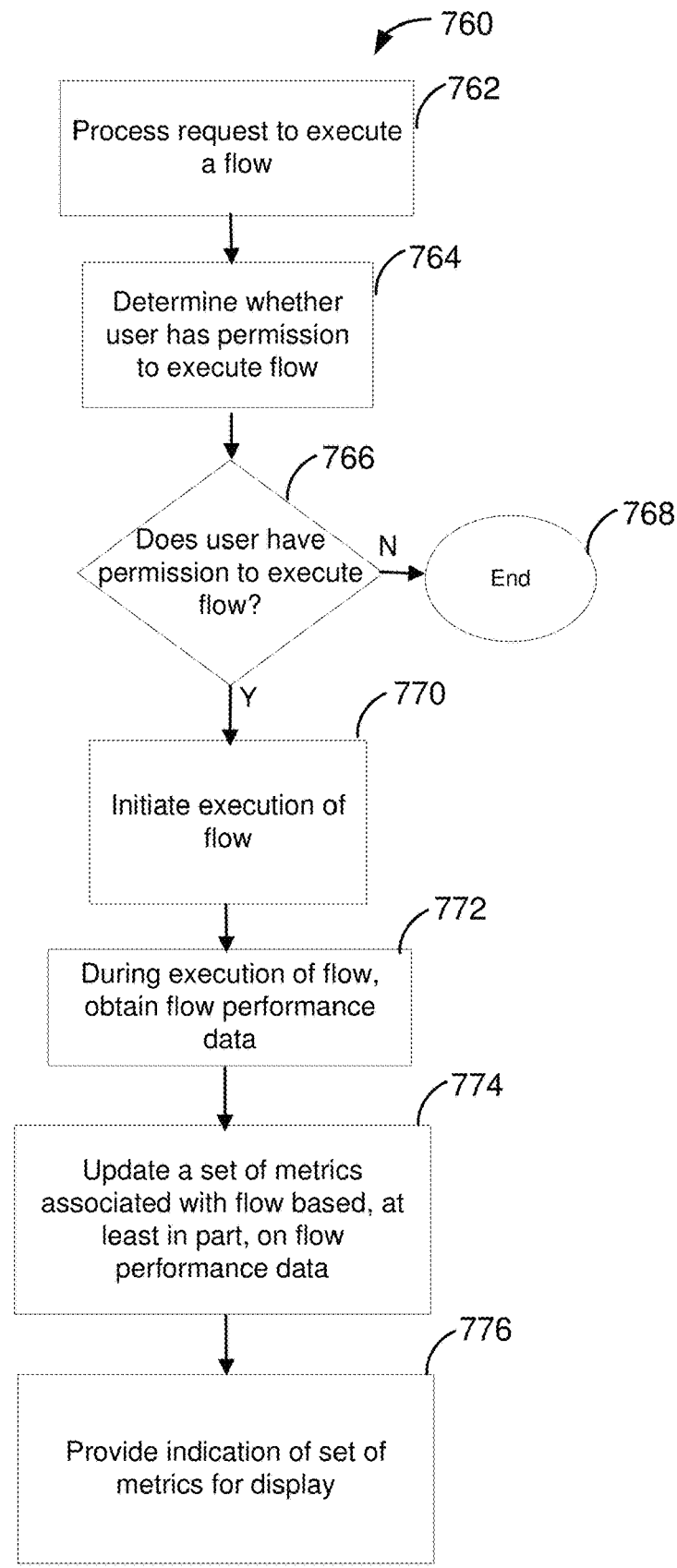
FIG. 7D shows an example of a method 760 for executing a process flow, in accordance with some implementations.

FIG. 7D shows an example of a method 760 for executing a process flow, in accordance with some implementations. A request to execute a flow is processed at 762. Responsive to processing the request to execute the flow, a flow engine may determine whether the user is permitted to execute or otherwise access the flow based, at least in part, on a set of flow permissions associated with the flow at 764. For example, the set of flow permissions can indicate one or more profile types permitted to access the flow, one or more user types permitted to access the flow, one or more user roles or job titles permitted to access the flow, one or more user groups or departments permitted to access the flow, and/or one or more user identifiers of user(s) permitted to access the flow.

In some implementations, the determination is made based, at least in part, on information maintained in a user profile associated with the user. The user profile can include a user identifier such as a name or alpha-numerical identifier. In addition, the user profile can include information indicating, for example, a profile type, a user type, an organizational group, an organizational department, a job title, and/or a role. If it is determined at 766 that the user does not have permission to execute or access the flow, the process ends at 768.

In some implementations, permissions associated with the flow are applied such that they override user permissions configured in a user profile of the user. For example, if the user permissions do not explicitly enable the user to access the flow or the user permissions prohibit the user from running the flow, the user permissions can be overridden to enable the flow to be executed in response to the request. As another example, if the user permissions permit the user to run the flow but the permissions associated with the flow do not permit the user to run the flow, the user permissions may be ignored by the system to prevent the user from accessing the flow.

Upon determining at 766 that the user is permitted to execute/access the flow, execution of the flow is initiated at 770. During execution of the flow, flow performance data associated with the flow is obtained at 772. A set of metrics associated with the flow is updated based, at least in part, on the flow performance data at 774. An indication of the set of metrics associated with the flow can be provided for presentation via a display at 776, as described above with reference to FIG. 7C.

In the above-described examples, it is assumed that a set of permissions associated with a flow is applied to sub-flows of the flow. More particularly, a child flow may inherit the permissions of a parent flow. In some implementations, inheritance may be applied where the child flow has not been configured with its own set of permissions. In other implementations, inheritance may be applied when specific condition(s) are met.

In other implementations, inheritance is not applied to flow permissions. Since each flow may be configured with a corresponding set of permissions, the main flow may be initiated according to a first set of permissions while a sub-flow may be executed according to a second set of permissions different from the first level of permissions. In some implementations, a flow that has not been configured with a set of permissions may be executed according to a default set of permissions.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, California salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
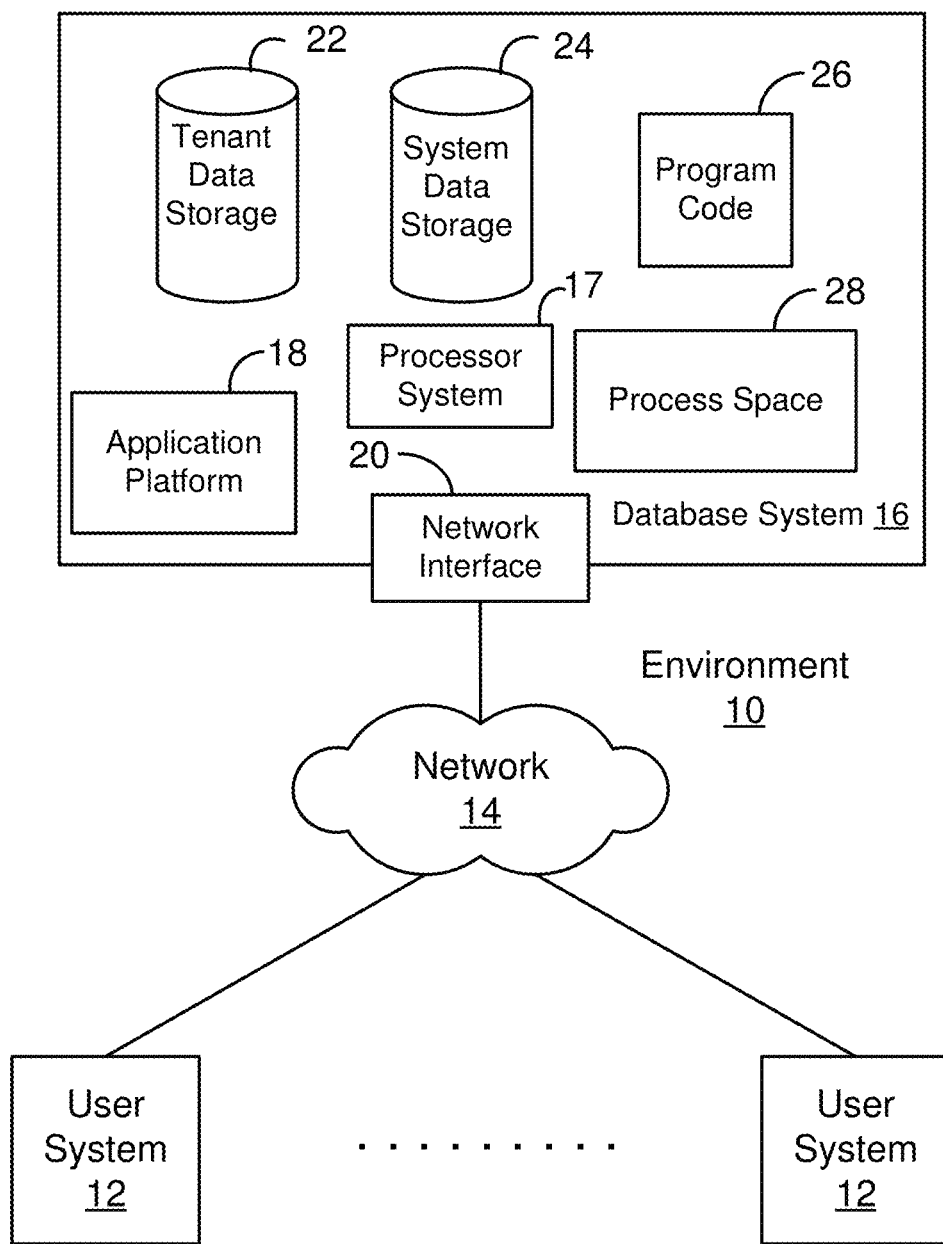
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
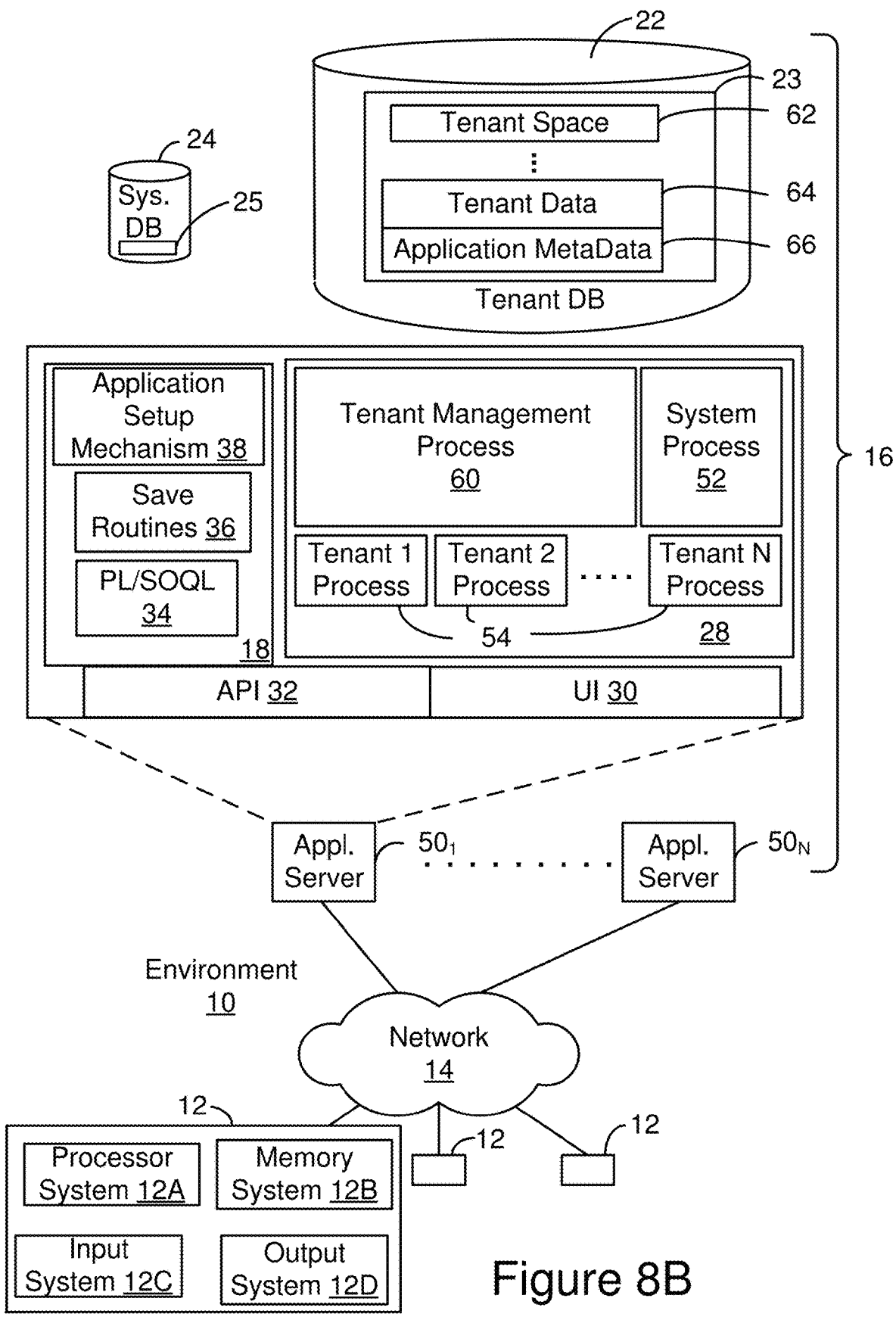
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
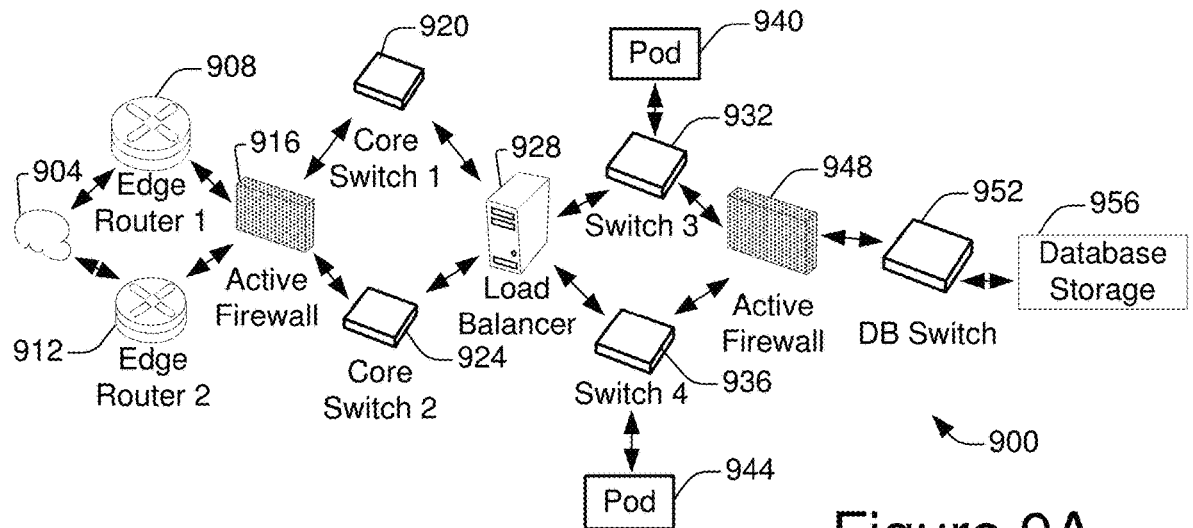
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
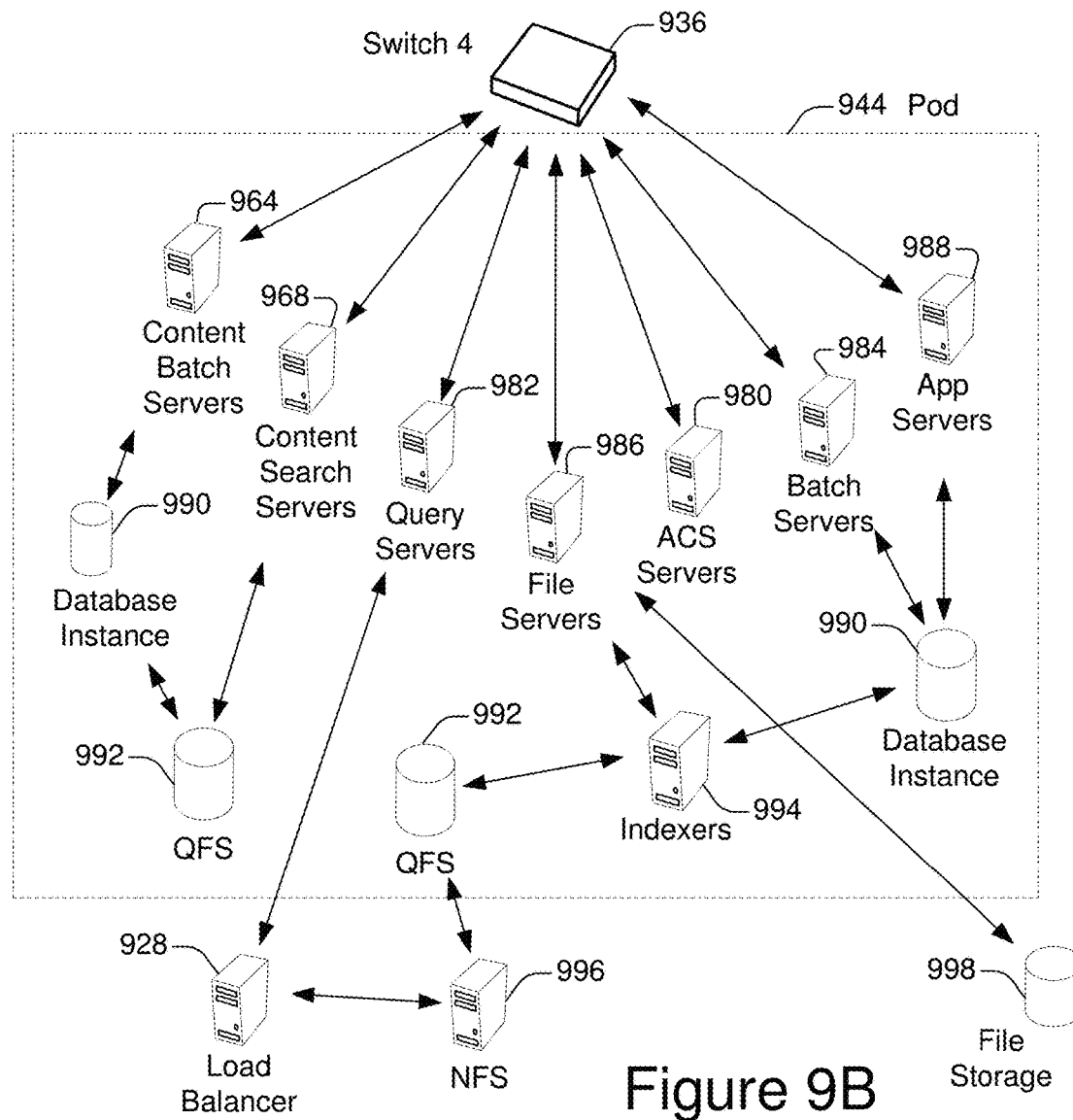
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system, the database system configurable to cause:
   providing, for presentation via a display device, a flow builder application including a graphical representation of a flow, the flow including a plurality of elements corresponding to computer-readable instructions;
   obtaining flow performance data associated with a plurality of different instances of the flow, the obtaining of the flow performance data including ascertaining a plurality of different paths of the flow that have been traversed during runs of the different instances of the flow, each different instance of the flow differing from one or more others of the different instances of the flow by one or more elements;
   generating or updating a set of metrics associated with the different instances of the flow based, at least in part, on the flow performance data, the set of metrics including one or more metrics collected across the runs of the different instances of the flow;
   providing, for presentation via the display device and within the flow builder application, at least a portion of the set of metrics associated with the different instances of the flow in relation to one or more elements of the flow, the portion of the set of metrics indicating a performance condition associated with the one or more elements of the flow, the performance condition including a duration of the one or more elements of the flow;
   processing an edit request to edit the flow based on the performance condition, the editing including one or more of adding, deleting, moving, or updating a flow parameter; and
   modifying the graphical representation of the flow responsive to processing the edit request.

2. The system as recited in claim 1, the database system further configurable to cause:
   providing, for presentation via the display device, a flow details page including one or more process insights.

3. The system as recited in claim 2, the database system further configurable to cause:
   providing, for presentation via the display device, a process advisor analytics page for flow process visualization and analytics.

4. The system as recited in claim 2, wherein the flow details page includes an option to have a process advisor analyze a flow.

5. The system as recited in claim 1, the database system further configurable to cause:
providing, for presentation via the display device, a process advisor including a selection to improve workflows and an option to display flow process analytics.

6. The system as recited in claim 1, the database system further configurable to cause:
storing a representation of the flow according to a result of modifying the graphical representation of the flow.

7. The system as recited in claim 1, wherein generating or updating is performed, at least in part, responsive to processing a request, received via an application programming interface (API), from a client device.

8. A computer program product comprising computer-readable program code capable of being executed by one or more processors when retrieved from a non-transitory computer-readable medium, the program code comprising computer-readable instructions configurable to cause:
providing, for presentation via a display device, a flow builder application including a graphical representation of a flow, the flow including a plurality of elements corresponding to computer-readable instructions;
obtaining flow performance data associated with a plurality of different instances of the flow, the obtaining of the flow performance data including ascertaining a plurality of different paths of the flow that have been traversed during runs of the different instances of the flow, each different instance of the flow differing from one or more others of the different instances of the flow by one or more elements;
generating or updating a set of metrics associated with the different instances of the flow based, at least in part, on the flow performance data, the set of metrics including one or more metrics collected across the runs of the different instances of the flow;
providing, for presentation via the display device and within the flow builder application, at least a portion of the set of metrics associated with the different instances of the flow in relation to one or more elements of the flow, the portion of the set of metrics indicating a performance condition associated with the one or more elements of the flow, the performance condition including a duration of the one or more elements of the flow;
processing an edit request to edit the flow based on the performance condition, the editing including one or more of adding, deleting, moving, or updating a flow parameter; and
modifying the graphical representation of the flow responsive to processing the edit request.

9. The computer program product as recited in claim 8, the instructions further configurable to cause:
providing, for presentation via the display device, a flow details page including one or more process insights.

10. The computer program product as recited in claim 9, the instructions further configurable to cause:
providing, for presentation via the display device, a process advisor analytics page for flow process visualization and analytics.

11. The computer program product as recited in claim 9, wherein the flow details page includes an option to have a process advisor analyze a flow.

12. The computer program product as recited in claim 8, the instructions further configurable to cause:
providing, for presentation via the display device, a process advisor including a selection to improve workflows and an option to display flow process analytics.

13. The computer program product as recited in claim 8, the instructions further configurable to cause:
storing a representation of the flow according to a result of modifying the graphical representation of the flow.

14. The computer program product as recited in claim 8, wherein generating or updating is performed, at least in part, responsive to processing a request, received via an application programming interface (API), from a client device.

15. A method, comprising:
providing, for presentation via a display device, a flow builder application including a graphical representation of a flow, the flow including a plurality of elements corresponding to computer-readable instructions;
obtaining flow performance data associated with a plurality of different instances of the flow, the obtaining of the flow performance data including ascertaining a plurality of different paths of the flow that have been traversed during runs of the different instances of the flow, each different instance of the flow differing from one or more others of the different instances of the flow by one or more elements;
generating or updating a set of metrics associated with the different instances of the flow based, at least in part, on the flow performance data, the set of metrics including one or more metrics collected across the runs of the different instances of the flow;
providing, for presentation via the display device and within the flow builder application, at least a portion of the set of metrics associated with the different instances of the flow in relation to one or more elements of the flow, the portion of the set of metrics indicating a performance condition associated with the one or more elements of the flow, the performance condition including a duration of the one or more elements of the flow;
processing an edit request to edit the flow based on the performance condition, the editing including one or more of adding, deleting, moving, or updating a flow parameter; and
modifying the graphical representation of the flow responsive to processing the edit request.

16. The method as recited in claim 15, further comprising:
providing, for presentation via the display device, a flow details page including one or more process insights.

17. The method as recited in claim 16, further comprising:
providing, for presentation via the display device, a process advisor analytics page for flow process visualization and analytics.

18. The method as recited in claim 16, wherein the flow details page includes an option to have a process advisor analyze a flow.

19. The method as recited in claim 15, further comprising:
providing, for presentation via the display device, a process advisor including a selection to improve workflows and an option to display flow process analytics.

20. The method as recited in claim 15, further comprising:
storing a representation of the flow according to a result of modifying the graphical representation of the flow.

* * * * *